(12) United States Patent
Franklin et al.

(10) Patent No.: US 10,941,828 B2
(45) Date of Patent: *Mar. 9, 2021

(54) GAS SPRING WITH TRAVEL CONTROL

(71) Applicant: Fox Factory, Inc., Scotts Valley, CA (US)

(72) Inventors: Joseph Franklin, Vancouver, WA (US); Robert C. Fox, Scotts Valley, CA (US)

(73) Assignee: Fox Factory, Inc., Braselton, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/165,875

(22) Filed: Oct. 19, 2018

(65) Prior Publication Data

US 2020/0124130 A1 Apr. 23, 2020

Related U.S. Application Data

(63) Continuation of application No. 15/237,371, filed on Aug. 15, 2016, now Pat. No. 10,132,379, which is a
(Continued)

(51) Int. Cl.
*F16F 9/34* (2006.01)
*B60G 11/27* (2006.01)
(Continued)

(52) U.S. Cl.
CPC ............ *F16F 9/3415* (2013.01); *B60G 11/27* (2013.01); *B62K 25/08* (2013.01); *F16F 9/0245* (2013.01);
(Continued)

(58) Field of Classification Search
CPC ........ F16F 9/0245; F16F 9/0218; F16F 9/516; F16F 9/50; F16F 9/461; F16F 9/0236; A47C 3/30; A47C 1/0244; B60G 11/27; B62K 2025/048; B62K 2025/045; B62K 25/04; B62K 25/08; B60N 2/525
(Continued)

(56) References Cited

U.S. PATENT DOCUMENTS 865,151 A 9/1907 Andrew
1,094,567 A 4/1914 Hofmann
(Continued)

FOREIGN PATENT DOCUMENTS

DE 725659 C 9/1942
DE 837508 C 4/1952
(Continued)

OTHER PUBLICATIONS

Bici Da Montagna—"Carraro 499 Piccante" (article in Italian), Mar. 1994.
(Continued)

*Primary Examiner* — Bradley T King
*Assistant Examiner* — Mahbubur Rashid

(57) ABSTRACT

In one embodiment, a gas spring having a travel control includes positive and negative chambers and a valve mechanism that controls the fluid communication between the chambers. The valve mechanism includes a valve bore that while only moving a small amount, allows for large changes in gas spring travel length.

15 Claims, 18 Drawing Sheets

Related U.S. Application Data continuation of application No. 14/336,929, filed on Jul. 21, 2014, now Pat. No. 9,415,653, which is a continuation of application No. 12/176,160, filed on Jul. 18, 2008, now abandoned, which is a continuation-in-part of application No. 11/560,403, filed on Nov. 16, 2006, now Pat. No. 8,464,850, and a continuation-in-part of application No. 11/372,707, filed on Mar. 10, 2006, now abandoned, and a continuation-in-part of application No. 10/237,333, filed on Sep. 5, 2002, now Pat. No. 7,703,585.

(60) Provisional application No. 61/038,015, filed on Mar. 19, 2008, provisional application No. 60/667,495, filed on Apr. 1, 2005, provisional application No. 60/392,802, filed on Jun. 28, 2002, provisional application No. 60/391,991, filed on Jun. 25, 2002.

(51) Int. Cl.
| | | |
|---|---|---|
| *B62K 25/08* | (2006.01) | |
| *F16F 9/02* | (2006.01) | |
| *F16F 9/06* | (2006.01) | |
| *F16F 9/46* | (2006.01) | |
| *F16K 15/04* | (2006.01) | |
| *B62K 25/04* | (2006.01) | |

(52) U.S. Cl.
CPC .............. *F16F 9/0281* (2013.01); *F16F 9/06* (2013.01); *F16F 9/46* (2013.01); *F16K 15/044* (2013.01); *B62K 2025/048* (2013.01); *F16F 2238/02* (2013.01)

(58) Field of Classification Search
USPC ...................................................... 267/61.11
See application file for complete search history.

(56) References Cited

U.S. PATENT DOCUMENTS

| | | |
|---|---|---|
| 1,281,079 A | 10/1918 | Sears |
| 1,492,328 A | 4/1924 | Lang |
| 1,946,882 A | 2/1934 | Sherman |
| 1,984,144 A | 12/1934 | Laugaudin |
| 1,992,490 A | 2/1935 | Lewis |
| 2,101,265 A | 12/1937 | Mercier |
| 2,115,072 A | 4/1938 | Hunt et al. |
| 2,265,435 A | 12/1941 | Kinzie et al. |
| 2,329,803 A | 9/1943 | Whisler, Jr. |
| 2,528,822 A | 11/1950 | Dunn |
| 2,569,503 A | 10/1951 | Thelander |
| 2,774,448 A | 12/1956 | Hultin |
| 2,894,742 A | 7/1959 | Peterson |
| 2,944,639 A | 7/1960 | Blake |
| 3,001,538 A | 9/1961 | Du |
| 3,039,761 A | 6/1962 | Zijp |
| 3,085,771 A | 4/1963 | Peterson |
| 3,086,786 A | 4/1963 | Tuczek |
| 3,114,705 A | 12/1963 | Prihonic et al. |
| 3,146,862 A | 9/1964 | Winsen |
| 3,201,110 A | 8/1965 | Taccone |
| 3,202,413 A | 8/1965 | Colmerauer |
| 3,215,283 A * | 11/1965 | Shaver .................... F16F 9/486 213/43 |
| 3,237,726 A | 3/1966 | Deyerling |
| 3,319,741 A | 5/1967 | Hauck |
| 3,338,347 A | 8/1967 | Avner |
| 3,379,430 A | 4/1968 | Hennells |
| 3,414,092 A | 12/1968 | Speckhart |
| 3,711,054 A | 1/1973 | Bauer |
| 3,722,875 A | 3/1973 | Hasse |
| 3,762,514 A * | 10/1973 | Freitag .................... A47C 3/30 188/300 |
| 3,836,132 A | 9/1974 | McNally et al. |
| 3,854,710 A | 12/1974 | Nicholls |
| 3,856,287 A | 12/1974 | Freitag |
| 3,873,122 A | 3/1975 | Fischer |
| 3,889,934 A | 6/1975 | Kamman |
| 3,970,292 A | 7/1976 | Dachicourt et al. |
| RE29,055 E | 11/1976 | Wagner |
| 4,029,306 A | 6/1977 | Sakaguchi et al. |
| 4,122,923 A | 10/1978 | Ellis et al. |
| 4,132,395 A | 1/1979 | Fox |
| 4,145,067 A | 3/1979 | Ceriani |
| 4,153,266 A | 5/1979 | Uhls |
| 4,159,105 A | 6/1979 | Vander Laan et al. |
| 4,159,756 A | 7/1979 | Murakami et al. |
| 4,206,934 A | 6/1980 | McKee |
| 4,254,849 A | 3/1981 | Pohlenz |
| 4,256,293 A | 3/1981 | Burgess |
| 4,273,310 A | 6/1981 | Ginzler |
| 4,295,658 A | 10/1981 | Kashima |
| 4,298,101 A | 11/1981 | Dressell et al. |
| 4,313,529 A | 2/1982 | Kato et al. |
| 4,325,541 A | 4/1982 | Korosladanyi et al. |
| 4,334,600 A | 6/1982 | Palitto |
| 4,337,849 A | 7/1982 | Siorek et al. |
| 4,386,766 A | 6/1983 | Bauer et al. |
| 4,390,159 A | 6/1983 | Duncan |
| 4,405,119 A | 9/1983 | Masclet et al. |
| 4,438,909 A | 3/1984 | Matsumoto |
| 4,452,117 A | 6/1984 | Brickner et al. |
| 4,457,340 A | 7/1984 | Krueger |
| 4,492,290 A | 1/1985 | Zavodny |
| 4,509,730 A | 4/1985 | Shtarkman |
| 4,527,676 A | 7/1985 | Emura et al. |
| 4,530,425 A | 7/1985 | Veaux et al. |
| 4,534,580 A | 8/1985 | Kobayashi et al. |
| 4,558,587 A | 12/1985 | Fruzzetti |
| 4,572,317 A | 2/1986 | Isono et al. |
| 4,576,258 A | 3/1986 | Spisak et al. |
| 4,591,186 A | 5/1986 | Ashiba |
| 4,592,540 A | 6/1986 | Yokoya et al. |
| 4,598,929 A | 7/1986 | Kumagai et al. |
| 4,606,440 A | 8/1986 | Buchanan et al. |
| 4,613,116 A | 9/1986 | Buma |
| 4,616,811 A | 10/1986 | Buma |
| 4,620,619 A | 11/1986 | Emura et al. |
| 4,629,170 A | 12/1986 | Warmuth, II |
| 4,631,116 A | 12/1986 | Ludwig |
| 4,635,906 A | 1/1987 | Buma |
| 4,647,069 A | 3/1987 | Iijima |
| 4,650,202 A | 3/1987 | Tsuzuki |
| 4,650,212 A | 3/1987 | Yoshimura |
| 4,651,977 A | 3/1987 | Buma |
| 4,653,735 A | 3/1987 | Buma |
| 4,659,070 A | 4/1987 | Buma |
| 4,660,688 A | 4/1987 | Spisak et al. |
| 4,660,810 A | 4/1987 | Buma |
| 4,666,135 A | 5/1987 | Buma et al. |
| 4,667,696 A | 5/1987 | Van Rensburg |
| 4,671,534 A | 6/1987 | Yano |
| 4,673,171 A | 6/1987 | Buma |
| 4,686,135 A | 8/1987 | Obayashi et al. |
| 4,686,626 A | 8/1987 | Kuroki et al. |
| 4,697,796 A | 10/1987 | Kitamura et al. |
| 4,717,173 A | 1/1988 | Sugasawa et al. |
| 4,735,401 A | 4/1988 | Buma et al. |
| 4,741,554 A | 5/1988 | Okamoto |
| 4,743,000 A | 5/1988 | Karnopp |
| 4,746,106 A | 5/1988 | Fukumura |
| 4,768,758 A | 9/1988 | Buma |
| 4,773,635 A | 9/1988 | Buma |
| 4,787,644 A | 11/1988 | Yokote et al. |
| 4,789,051 A | 12/1988 | Kruckemeyer et al. |
| 4,827,416 A | 5/1989 | Kawagoe et al. |
| 4,828,464 A | 5/1989 | Maier et al. |
| 4,838,306 A | 6/1989 | Horn et al. |
| 4,844,428 A | 7/1989 | Margolis et al. |
| 4,899,853 A | 2/1990 | Hummel |
| 4,901,986 A | 2/1990 | Smith |
| 4,915,364 A | 4/1990 | Perlini |

(56) References Cited

U.S. PATENT DOCUMENTS

| | | | |
|---|---|---|---|
| 4,917,222 A | 4/1990 | Bacardit | |
| 4,936,423 A | 6/1990 | Karnopp | |
| 4,936,424 A | 6/1990 | Costa | |
| 4,944,705 A | 7/1990 | Kashima et al. | |
| 4,948,104 A | 8/1990 | Wirges | |
| 4,958,706 A | 9/1990 | Richardson et al. | |
| 4,974,820 A | 12/1990 | Nakanishi | |
| 4,993,523 A | 2/1991 | Schwemmer et al. | |
| 4,999,872 A | 3/1991 | Jentsch | |
| 5,037,062 A | 8/1991 | Neuhaus | |
| 5,067,517 A | 11/1991 | Ting-Chih et al. | |
| 5,067,518 A | 11/1991 | Kosmyna | |
| 5,072,813 A | 12/1991 | Yoshioka et al. | |
| 5,080,205 A | 1/1992 | Miller et al. | |
| 5,111,735 A | 5/1992 | Johnson | |
| 5,139,119 A | 8/1992 | Karnopp | |
| 5,150,775 A | 9/1992 | Charles et al. | |
| 5,158,270 A | 10/1992 | Lin | |
| 5,163,538 A | 11/1992 | Derr et al. | |
| 5,169,129 A | 12/1992 | Hoffman | |
| 5,180,186 A | 1/1993 | Charles et al. | |
| 5,186,481 A | 2/1993 | Turner | |
| 5,201,388 A | 4/1993 | Malm | |
| 5,201,389 A | 4/1993 | Miller et al. | |
| 5,228,640 A | 7/1993 | Mouille | |
| 5,251,927 A | 10/1993 | Charles et al. | |
| 5,275,264 A | 1/1994 | Isella | |
| 5,279,480 A | 1/1994 | Derrien et al. | |
| 5,285,875 A | 2/1994 | Munoz | |
| 5,285,876 A | 2/1994 | Shimizu et al. | |
| 5,296,089 A | 3/1994 | Chen et al. | |
| 5,306,122 A | 4/1994 | Gebauer et al. | |
| 5,332,068 A | 7/1994 | Richardson et al. | |
| 5,346,236 A | 9/1994 | Ohma | |
| 5,360,089 A | 11/1994 | Nakamura et al. | |
| 5,386,893 A | 2/1995 | Feigel | |
| 5,396,973 A | 3/1995 | Schwemmer et al. | |
| 5,404,972 A | 4/1995 | Popjoy et al. | |
| 5,413,316 A | 5/1995 | Easter | |
| 5,428,533 A | 6/1995 | Ogawa | |
| 5,449,188 A | 9/1995 | Ohma | |
| 5,456,480 A | 10/1995 | Turner et al. | |
| 5,462,140 A | 10/1995 | Cazort et al. | |
| 5,470,090 A | 11/1995 | Stewart et al. | |
| 5,509,674 A | 4/1996 | Browning | |
| 5,522,483 A * | 6/1996 | Koch | F16F 9/461 188/266.6 |
| 5,529,152 A | 6/1996 | Hamilton et al. | |
| 5,533,597 A | 7/1996 | Nezu et al. | |
| 5,538,276 A | 7/1996 | Tullis | |
| 5,566,796 A * | 10/1996 | De Kock | F16F 9/3214 188/282.1 |
| 5,580,075 A * | 12/1996 | Turner | B62K 25/08 267/141.1 |
| 5,585,876 A | 12/1996 | Kobayashi | |
| 5,586,781 A | 12/1996 | Anderson | |
| 5,598,903 A | 2/1997 | Richardson | |
| 5,620,194 A * | 4/1997 | Keeler | B60G 11/27 280/81.6 |
| 5,632,471 A | 5/1997 | Pradel | |
| 5,653,315 A | 8/1997 | Ekquist et al. | |
| 5,725,226 A | 3/1998 | Cabrerizo-Pariente et al. | |
| 5,775,677 A | 7/1998 | Englund | |
| 5,799,758 A | 9/1998 | Huang | |
| 5,803,482 A | 9/1998 | Kim | |
| 5,823,305 A | 10/1998 | Richardson et al. | |
| 5,842,688 A | 12/1998 | Dore et al. | |
| 5,862,895 A | 1/1999 | Ricard | |
| 5,915,674 A | 6/1999 | Wolf et al. | |
| 5,921,572 A | 7/1999 | Bard et al. | |
| 5,954,167 A | 9/1999 | Richardson et al. | |
| 5,957,252 A | 9/1999 | Berthold | |
| 5,971,116 A | 10/1999 | Franklin | |
| 5,996,978 A | 12/1999 | Asanuma et al. | |
| 6,010,119 A | 1/2000 | Hsiao | |
| 6,029,958 A | 2/2000 | Larsson et al. | |
| 6,050,583 A | 4/2000 | Bohn | |
| 6,073,736 A | 6/2000 | Franklin | |
| 6,095,541 A | 8/2000 | Turner et al. | |
| 6,105,987 A | 8/2000 | Turner | |
| 6,105,988 A | 8/2000 | Turner et al. | |
| 6,109,400 A | 8/2000 | Ayyildiz et al. | |
| 6,119,830 A | 9/2000 | Richardson et al. | |
| 6,135,434 A | 10/2000 | Marking | |
| 6,149,125 A | 11/2000 | Nilsson | |
| 6,149,174 A | 11/2000 | Bohn | |
| 6,234,461 B1 | 5/2001 | Böhm et al. | |
| 6,254,067 B1 | 7/2001 | Yih | |
| 6,267,400 B1 | 7/2001 | McAndrews | |
| 6,279,703 B1 | 8/2001 | Mete | |
| 6,296,092 B1 | 10/2001 | Marking et al. | |
| 6,311,962 B1 | 11/2001 | Marking | |
| 6,318,525 B1 | 11/2001 | Vignocchi et al. | |
| 6,334,600 B1 | 1/2002 | Sakamoto | |
| 6,340,153 B1 | 1/2002 | Miesner | |
| 6,343,807 B1 | 2/2002 | Rathbun | |
| 6,360,857 B1 | 3/2002 | Fox et al. | |
| 6,386,525 B1 | 5/2002 | Stuart | |
| 6,412,615 B1 | 7/2002 | Perez | |
| 6,412,759 B1 | 7/2002 | Krauss | |
| 6,415,895 B2 | 7/2002 | Marking et al. | |
| 6,457,730 B1 | 10/2002 | Urbach | |
| 6,464,053 B1 | 10/2002 | Hoebrechts | |
| 6,464,201 B2 | 10/2002 | Job | |
| 6,467,592 B1 | 10/2002 | Dernebo | |
| 6,491,146 B1 | 12/2002 | Yi et al. | |
| 6,505,719 B2 | 1/2003 | Gonzalez et al. | |
| 6,508,460 B2 | 1/2003 | Job | |
| 6,543,754 B2 | 4/2003 | Ogura | |
| 6,543,799 B2 | 4/2003 | Miyoshi | |
| 6,581,948 B2 | 6/2003 | Fox | |
| 6,592,136 B2 | 7/2003 | Becker et al. | |
| 6,595,537 B2 | 7/2003 | Miyoshi et al. | |
| 6,604,751 B2 | 8/2003 | Fox | |
| 6,612,599 B2 | 9/2003 | Miyoshi | |
| 6,619,684 B2 | 9/2003 | Miyoshi | |
| 6,648,109 B2 | 11/2003 | Farr et al. | |
| 6,659,240 B2 | 12/2003 | Dernebo | |
| 6,659,241 B2 | 12/2003 | Sendrea | |
| 6,669,219 B2 | 12/2003 | Turner et al. | |
| 6,688,626 B2 | 2/2004 | Felsl et al. | |
| 6,698,730 B2 | 3/2004 | Easter | |
| 6,698,780 B2 | 3/2004 | Miyoshi | |
| 6,708,803 B2 | 3/2004 | Jensen | |
| 6,708,999 B1 | 3/2004 | Baltes et al. | |
| 6,722,678 B2 | 4/2004 | McAndrews | |
| 6,786,498 B1 | 9/2004 | Chang | |
| 6,824,146 B2 | 11/2004 | Kang | |
| 6,824,154 B1 | 11/2004 | Turner | |
| 6,863,291 B2 | 3/2005 | Miyoshi | |
| 6,866,281 B2 | 3/2005 | Chamberlain et al. | |
| 6,883,650 B2 | 4/2005 | Van Wonderen et al. | |
| 6,883,810 B2 | 4/2005 | Svartz et al. | |
| 6,938,887 B2 | 9/2005 | Achenbach | |
| 6,974,001 B2 | 12/2005 | Bauman | |
| 6,976,692 B2 | 12/2005 | Miyoshi et al. | |
| 6,978,872 B2 | 12/2005 | Turner | |
| 6,991,076 B2 | 1/2006 | McAndrews | |
| 6,991,621 B2 | 1/2006 | Bacher et al. | |
| 7,000,907 B2 | 2/2006 | Achenbach | |
| 7,011,193 B2 | 3/2006 | Lemmens et al. | |
| 7,011,325 B2 | 3/2006 | Kinzler et al. | |
| 7,017,893 B1 * | 3/2006 | Vincenzo | B62K 25/04 188/304 |
| 7,017,928 B2 | 3/2006 | Felsl et al. | |
| 7,021,434 B2 | 4/2006 | Beck | |
| 7,128,192 B2 | 10/2006 | Fox | |
| 7,163,223 B2 | 1/2007 | Wesling et al. | |
| 7,182,358 B2 | 2/2007 | Felsl et al. | |
| 7,188,712 B2 | 3/2007 | Vogelsang et al. | |
| 7,195,234 B2 | 3/2007 | Jordan et al. | |
| 7,219,881 B2 | 5/2007 | Denk | |
| 7,299,908 B2 | 11/2007 | Achenbach | |
| 7,374,028 B2 | 5/2008 | Fox | |

(56) References Cited

U.S. PATENT DOCUMENTS

| | | |
|---|---|---|
| 7,401,800 B2 | 7/2008 | Jordan |
| 7,441,638 B2 | 10/2008 | Hanawa |
| 7,641,028 B2 | 1/2010 | Fox |
| 7,703,585 B2 | 4/2010 | Fox |
| 7,870,936 B2 | 1/2011 | Shipman |
| 7,963,509 B2 | 6/2011 | Fox et al. |
| 8,464,850 B2 | 6/2013 | Fox |
| 8,752,681 B2 | 6/2014 | Fox |
| 9,186,950 B2 * | 11/2015 | Wootten ............ B60G 15/12 |
| 9,415,653 B2 | 8/2016 | Franklin et al. |
| 9,567,029 B2 | 2/2017 | Fox |
| 9,796,447 B2 | 10/2017 | Fox |
| 9,802,670 B2 | 10/2017 | Fox |
| 10,202,166 B2 | 2/2019 | Fox |
| 2002/0117830 A1 | 8/2002 | Holt et al. |
| 2002/0175035 A1 | 11/2002 | Achenbach |
| 2003/0116897 A1 * | 6/2003 | Knapp ............ F16F 9/0272 267/64.12 |
| 2003/0234144 A1 | 12/2003 | Fox |
| 2004/0020730 A1 | 2/2004 | Turner |
| 2004/0061303 A1 | 4/2004 | Felsl et al. |
| 2004/0094376 A1 | 5/2004 | Van Wonderen et al. |
| 2004/0163905 A1 | 8/2004 | Braswell et al. |
| 2004/0222056 A1 | 11/2004 | Fox |
| 2004/0232650 A1 | 11/2004 | Felsl et al. |
| 2004/0245746 A1 | 12/2004 | Chamberlain et al. |
| 2004/0262879 A1 | 12/2004 | Kinzler et al. |
| 2005/0012255 A1 | 1/2005 | Denk |
| 2005/0012297 A1 | 1/2005 | Miyoshi et al. |
| 2005/0023094 A1 | 2/2005 | McAndrews |
| 2005/0056501 A1 | 3/2005 | De Molina |
| 2005/0103586 A1 * | 5/2005 | Knaust ............ F16F 9/0245 188/275 |
| 2005/0104320 A1 | 5/2005 | Wesling et al. |
| 2005/0116399 A1 | 6/2005 | Jordan et al. |
| 2005/0173212 A1 | 8/2005 | Vogelsang et al. |
| 2005/0212187 A1 | 9/2005 | Achenbach |
| 2006/0289258 A1 | 12/2006 | Fox |
| 2007/0057420 A1 | 3/2007 | Jordan et al. |
| 2007/0090624 A1 | 4/2007 | Chen |
| 2008/0116622 A1 | 5/2008 | Fox |
| 2008/0179796 A1 | 7/2008 | Fox |
| 2008/0290571 A1 | 11/2008 | Krauss |
| 2008/0296814 A1 | 12/2008 | Franklin et al. |
| 2010/0044975 A1 * | 2/2010 | Yablon ............ B60G 11/27 280/5.503 |
| 2011/0204549 A1 | 8/2011 | Fox et al. |
| 2015/0183487 A1 * | 7/2015 | Tsai ............ B62K 25/28 280/284 |
| 2015/0276003 A1 * | 10/2015 | Ohta ............ F16F 9/44 188/317 |
| 2016/0348747 A1 | 12/2016 | Franklin et al. |
| 2017/0106937 A1 | 4/2017 | Fox |
| 2018/0057100 A1 | 3/2018 | Fox |

FOREIGN PATENT DOCUMENTS

| | | |
|---|---|---|
| DE | 1455159 A1 | 3/1969 |
| DE | 3233160 A1 | 3/1984 |
| DE | 4018712 A1 | 12/1991 |
| DE | 4123643 A1 | 6/1992 |
| DE | 4429562 A1 | 2/1996 |
| DE | 10236621 A1 | 3/2004 |
| DE | 102004021586 A1 | 12/2005 |
| EP | 101589 A1 | 2/1984 |
| EP | 164189 A1 | 12/1985 |
| EP | 166702 A2 | 1/1986 |
| EP | 0245221 A2 | 11/1987 |
| EP | 342683 A2 | 11/1989 |
| EP | 0420610 A1 | 4/1991 |
| EP | 474171 A1 | 3/1992 |
| EP | 0541891 A1 | 5/1993 |
| EP | 666803 A1 | 8/1995 |
| EP | 0834448 A2 | 4/1998 |
| EP | 1464866 A2 | 10/2004 |
| ES | 8608123 A1 | 11/1986 |
| FI | 931949 A | 4/1993 |
| FR | 1174491 A | 3/1959 |
| FR | 2725948 A1 | 4/1996 |
| FR | 2728948 A1 | 7/1996 |
| FR | 2753510 A1 | 3/1998 |
| FR | 2800702 A1 | 5/2001 |
| FR | 2863328 A1 | 6/2005 |
| FR | 2866628 A1 | 8/2005 |
| GB | 835151 A | 5/1960 |
| GB | 865151 A | 4/1961 |
| GB | 2265435 A | 9/1993 |
| GB | 2286566 A | 8/1995 |
| IT | 1237933 B | 6/1993 |
| IT | 1247985 B | 1/1995 |
| JP | 5701008509 A | 1/1982 |
| JP | 57018509 Y2 | 4/1982 |
| JP | 59026639 A | 2/1984 |
| JP | 61135808 A | 6/1986 |
| JP | 61235212 A | 10/1986 |
| JP | 61235215 A | 10/1986 |
| JP | 07167189 A | 7/1995 |
| SU | 623759 A1 | 9/1978 |
| WO | 9323283 A1 | 11/1993 |
| WO | 9903726 A1 | 1/1999 |
| WO | 9910223 A1 | 3/1999 |
| WO | 9914104 A1 | 3/1999 |
| WO | 9925989 A2 | 5/1999 |
| WO | 9958392 A1 | 11/1999 |
| WO | 0238437 A1 | 5/2002 |
| WO | 03029687 A1 | 4/2003 |
| WO | 2004016966 A1 | 2/2004 |
| WO | 2004041563 A1 | 5/2004 |
| WO | 2005108818 A1 | 11/2005 |
| WO | 2006054994 A1 | 5/2006 |

OTHER PUBLICATIONS

Fox Factory Catalog (Twin-Clicker Shox), 1983.
FOX Twin-Clicker Owner's Manual, Dec. 1981.
FOX-various articles-Motocross Action Dec. 1981; Fox Factory 1983; Moto-X Fox 1981; Vanilla Float 1998; Mountain biking Oct. 1998; Cycle World Dec. 1981; undated.
Listing of Forks, undated, unidentified, 1987-1991.
Marzocchi literature—"Marzocchi '95: The Going Gets Rough"; "We Are the Champions", undated.
Motorcycle Cruiser—"How to Improve the Ride and Suspension Performance of Cruiser Motorcycles", www.motorcyclecruiser.com/tech/improve_ride_suspension_performance, 2006 (2 pages).
Motoxcross Museum—"The History of Fox Air Shocks", 2001 (9 pages).
Office Action dated Feb. 26, 2009, U.S. Appl. No. 11/372,707.
Risee Racing Technology—"Remote Adjustable Air Chamber", Webpage 1999/2005 (2 pages).
Rock Shock Documents—various articles dated 1993, 1996-1998, 2000, 2004.
Showa Advertisement—Mountain Bike, Jun. 22-23, 1994 (3 pages).
Sieman, Rick, "Do it Yourself Tech—Dial in Your Forks", www.off-road.com/dirtbike/tech/forks, Jul. 1, 2005 (6 pages).
Specification and drawing of U.S. Appl. No. 11/372,707.
Sport Rider—"Suspension Tuning Guide—Learning the Lingo", www.sportrider.com/tech/146.0006.susp_lingo, Feb. 24, 2009, (2 pages).
Tutto Mountain Bike—"Turro Meteor" (article in Italian), Sep. 1992 (p. 57).
U.S. Appl. No. 11/372,707, filed Mar. 10, 2006.
"Bicycle Guide", "Suspension's Great for Paris-Roubaix, But What Does It Do for Me?", Bicycle Guide, Jul. 1994, pp. 29-32, and 39., Jul. 1994.
"Bicycling", Bicycling—Aug. 1993.
"Bike Pulse", Bike Pulse—"Rock Shock President Bryan Kelln", May 2000 (pp. 4-6 and 8), May 2000.
"Cane Creek", Cane Creek—AD-10 and AD-12 literature (6 pages).

(56) References Cited

OTHER PUBLICATIONS

"Cannondale Documents-Various Articles", Cannodale documents—various articles dated 1993 and undated, 1993.
"Ceriani", Ceriani—various articles, undated.
"Fox Factory", Fox Factory—DHX, Fox Factory 2008 Aftermarket Catalog (2 pages).
"Mountain Bike", Mountain Bike—"the History of the Revolution", Aug. 2001 (pp. 34-36, 38, 40, 42); "Fork it over" (p. 12), Aug. 2001.
"Mountain Bike Action", Mountain Bike Action—various articles dated Feb. 1992, Jan. 1993, Nov. 1991, Jan. 1993, Dec. 1997, and Feb. 1991.
"Mountain Biking", Mountain Biking—Bulletin Board, "Smart Like a Fox", Oct. 1996 (p. 16), Oct. 1996.
"Road Bike", Road Bike Action—"Rock Shox on the Road to Roubaix", Aug. 1993, pp. 28-34 and 101, Aug. 1993.
"Rock Shox", Rock Shox—Basic SID rear shock dimensional drawings (2 pages).
"Rock Shox", Rock Shox—Fork SID Manuals, 1998-2000 (15 pages).
"Rock Shox", Rock Shox—Shock SID Manuals.
"Rockshox 1998 SID User's Manual ("Air Damping Orifice Adjuster")".
"Sospensioni", Sospensioni—article in Italian, 1993, (p. 27).
Chipps, "Profile", Various Articles: Maverick American. Maverick American—Paul Turner, profile (7 pages), Spring 2004.
Gieck, Riding on Air: A History of Air suspension, Society of Automotive Engineers, Inc., 1999 (p. 222).
Rosso, ""How to Set KTM Fork Oil Level"".

\* cited by examiner

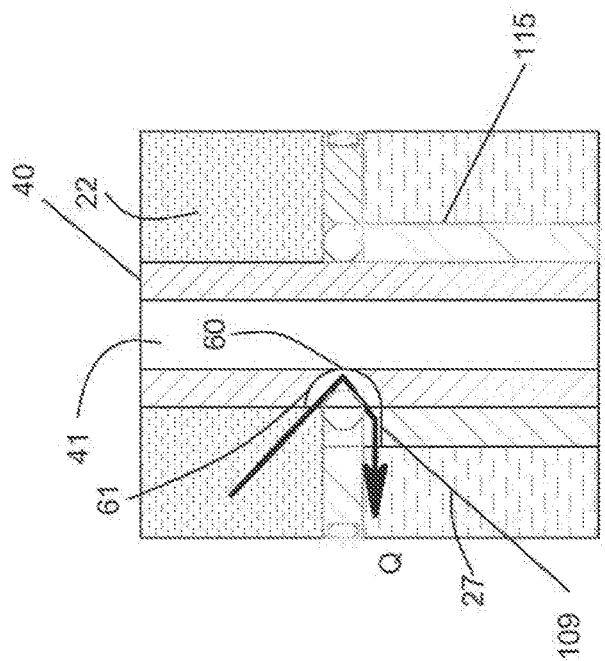
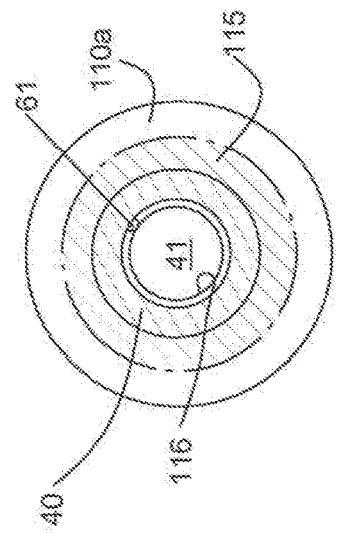
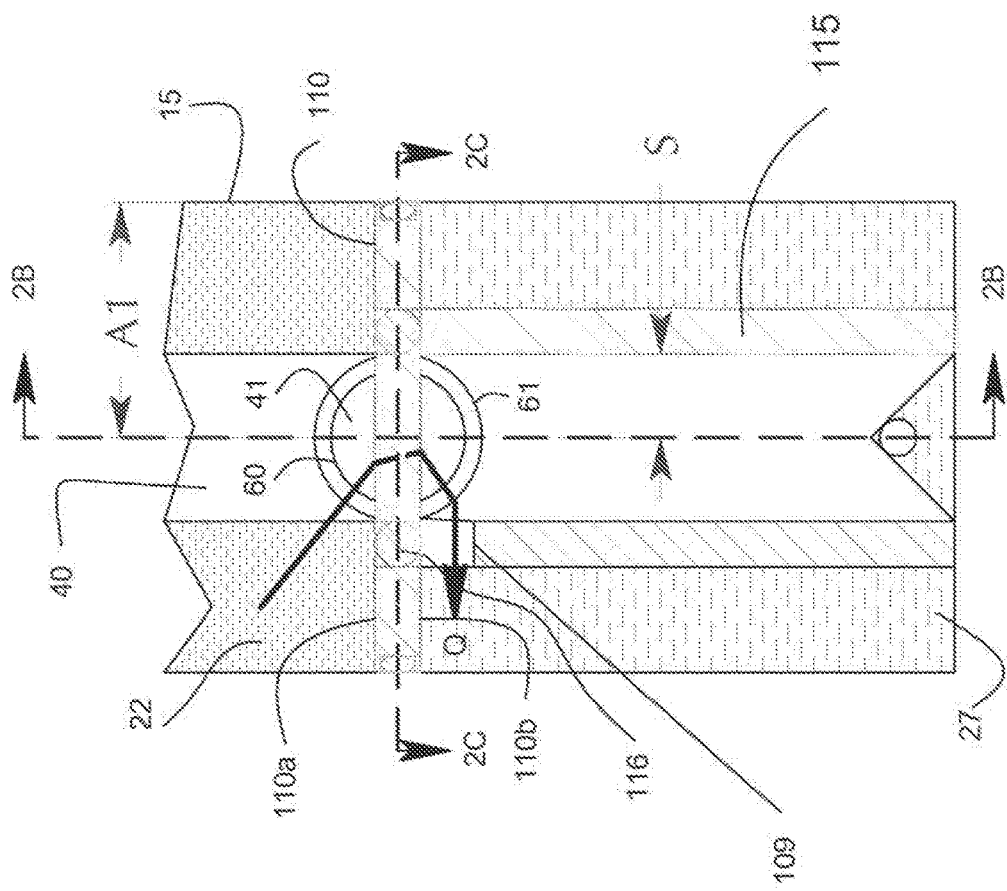

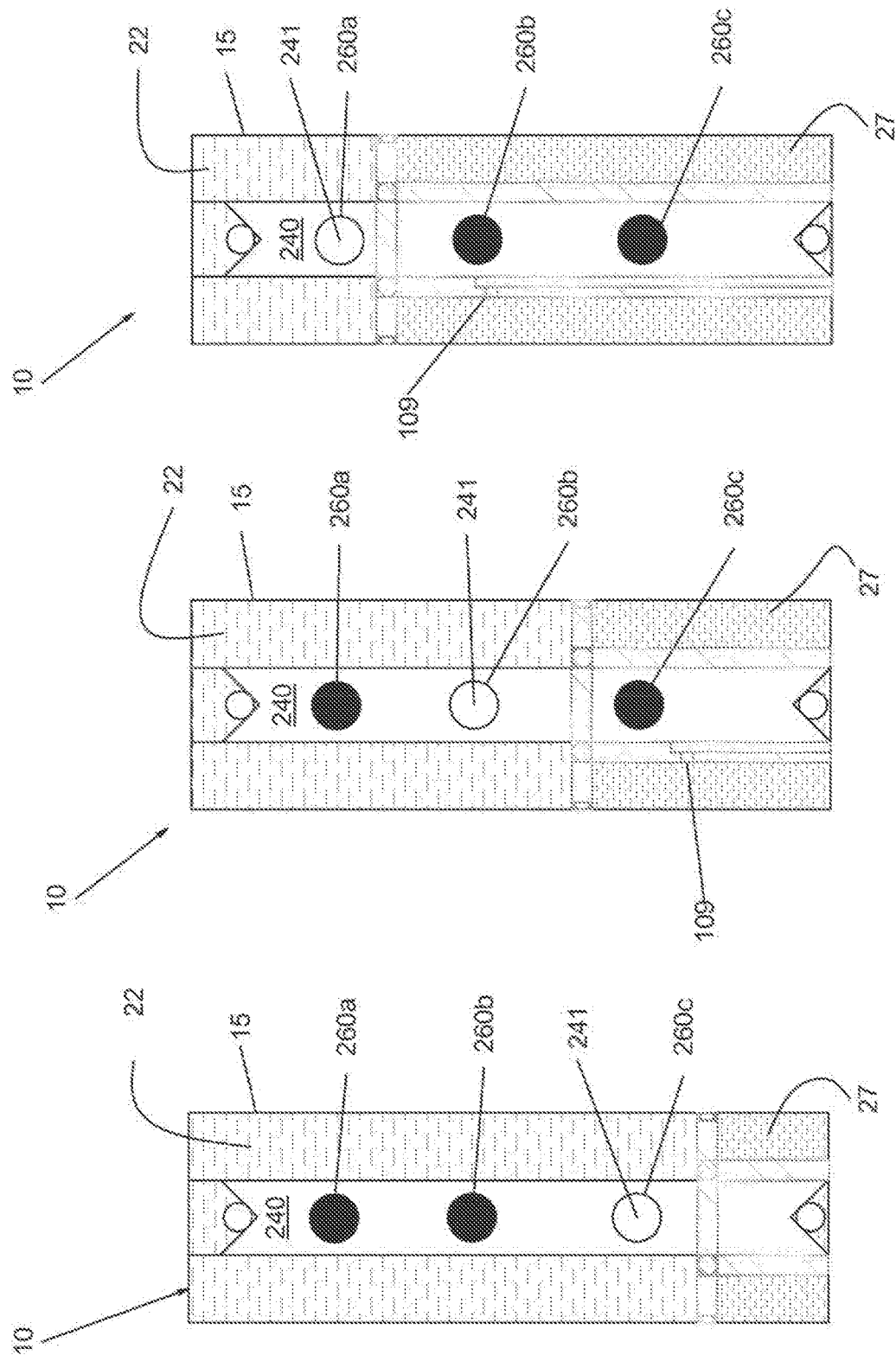

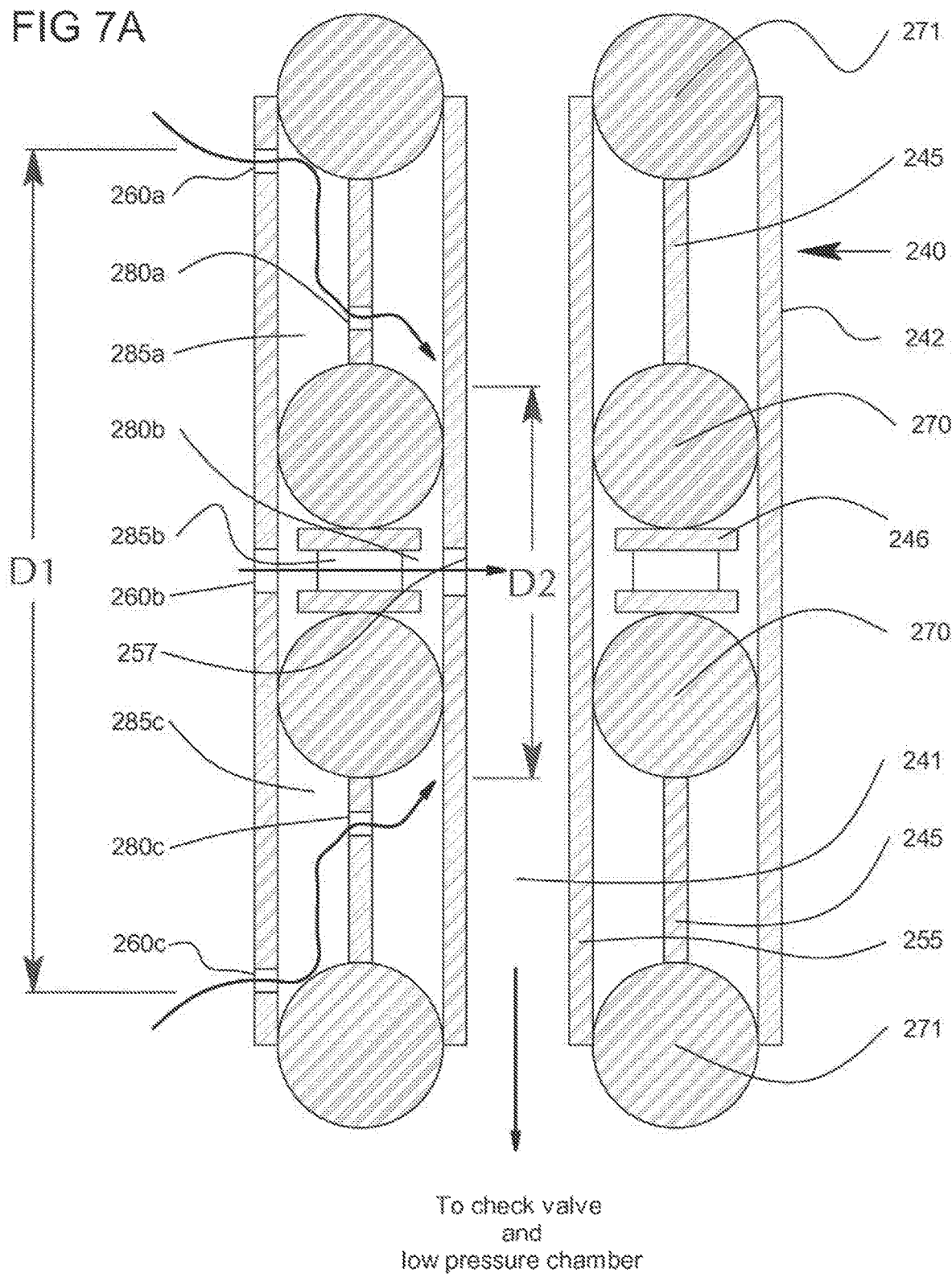

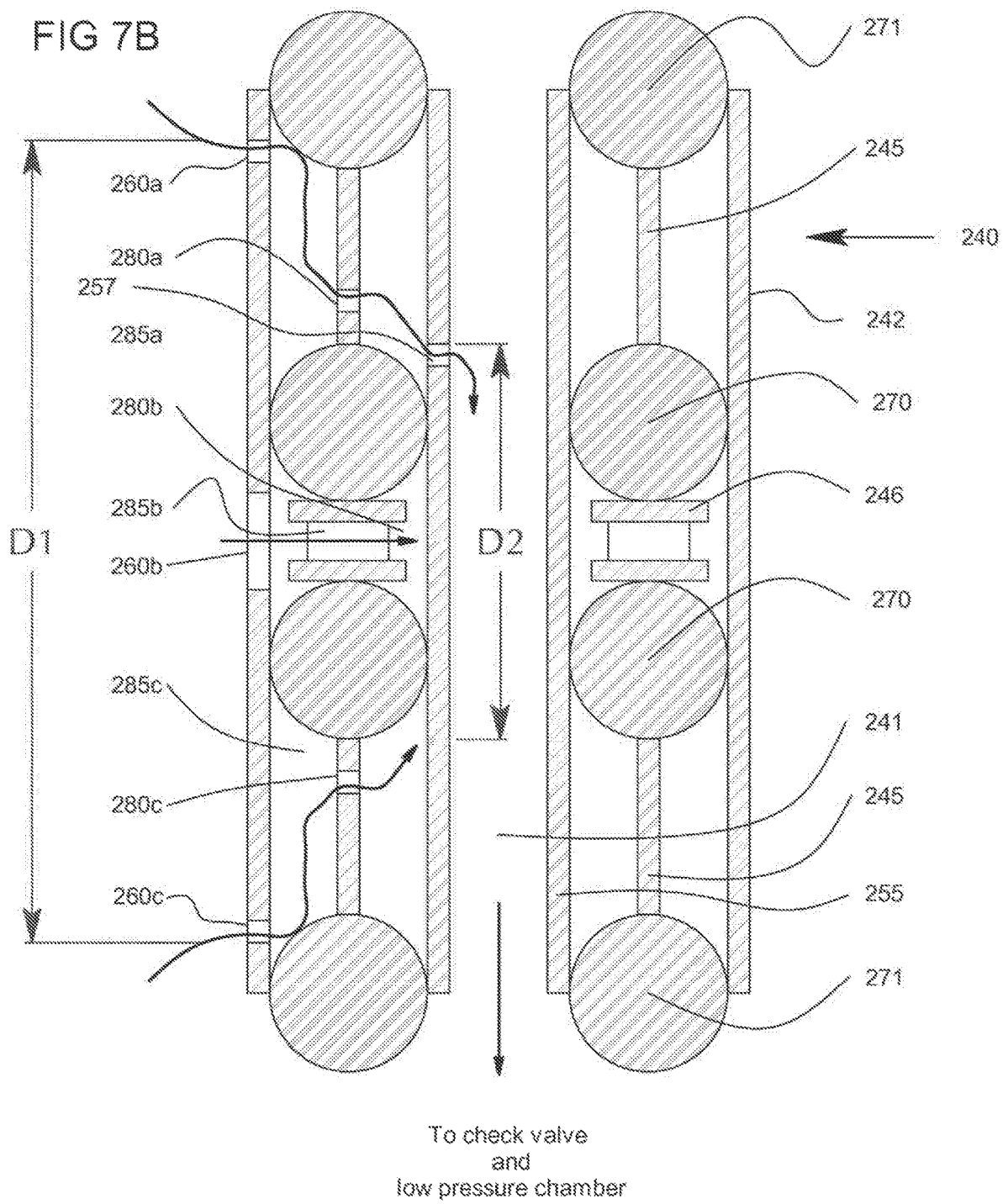

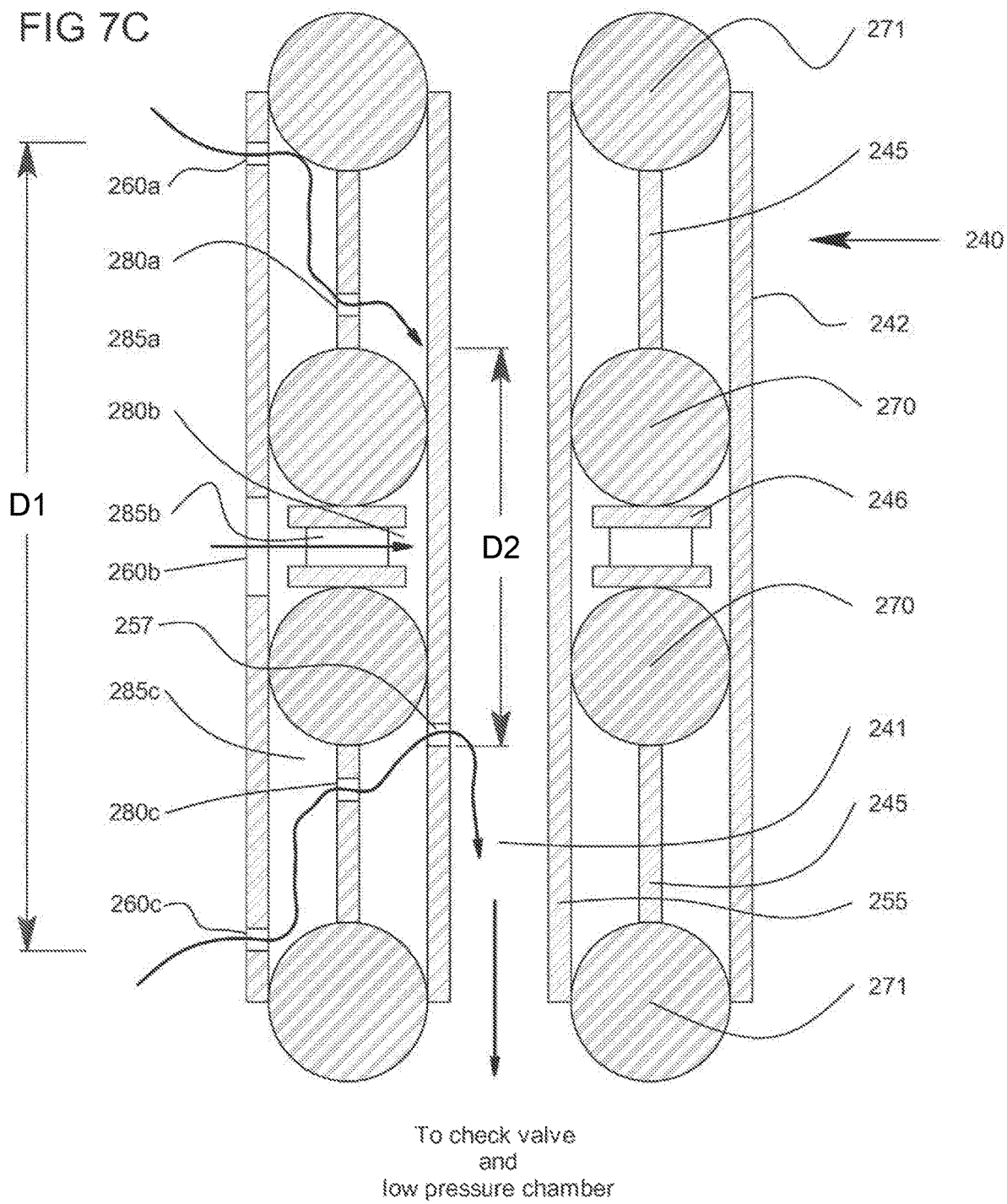

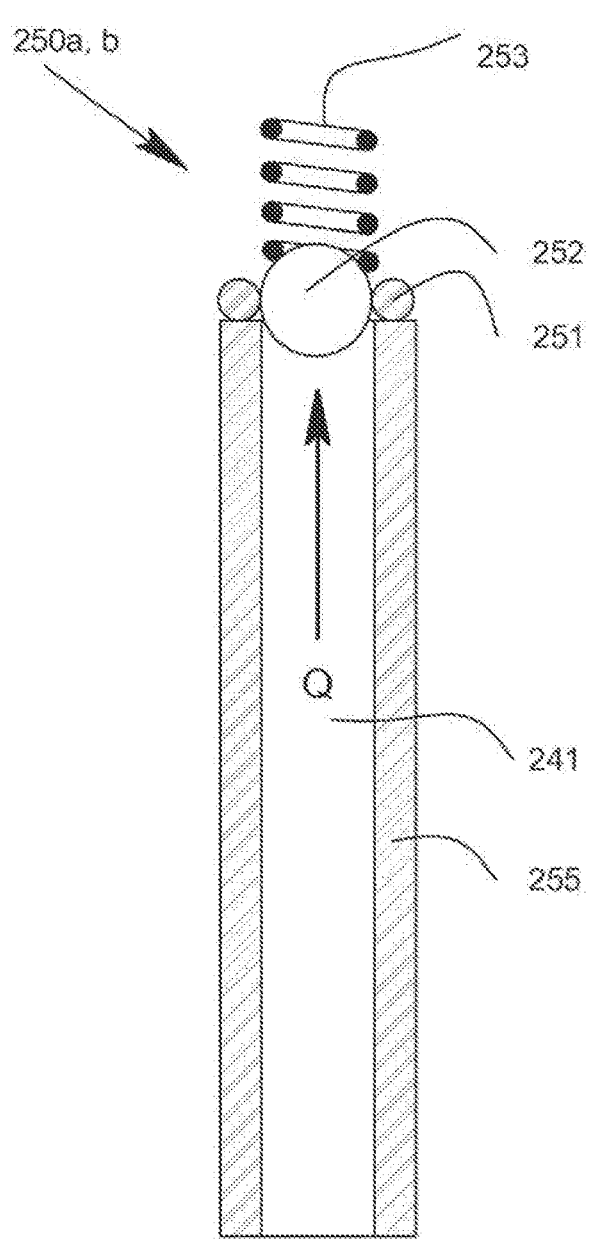
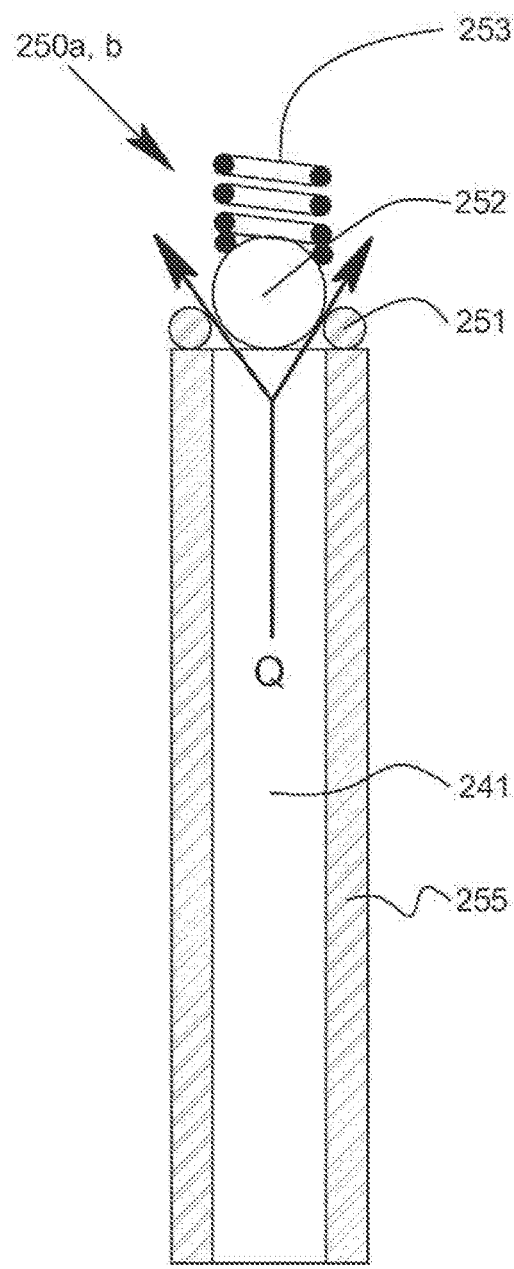
FIG 16A
FIG 16B

GAS SPRING WITH TRAVEL CONTROL

CROSS-REFERENCE TO RELATED APPLICATIONS

This application is a continuation application of and claims priority to and benefit of U.S. patent application Ser. No. 15/237,371 filed on Aug. 15, 2016 entitled "GAS SPRING WITH TRAVEL CONTROL" by Joseph Franklin et al., assigned to the assignee of the present application, and incorporated herein, in its entirety, by reference.

The application Ser. No. 15/237,371 is a continuation application of and claims priority to and benefit of U.S. patent application Ser. No. 14/336,929 filed on Jul. 21, 2014, now U.S. Issued U.S. Pat. No. 9,415,653, entitled "GAS SPRING WITH TRAVEL CONTROL" by Joseph Franklin et al., having, assigned to the assignee of the present application, and incorporated herein, in its entirety, by reference.

The application Ser. No. 14/336,929 is a continuation application of and claims priority to and benefit of U.S. patent application Ser. No. 12/176,160, now abandoned, filed on Jul. 18, 2008 entitled "GAS SPRING WITH TRAVEL CONTROL" by Joseph Franklin et al., assigned to the assignee of the present application, and incorporated herein, in its entirety, by reference.

The application Ser. No. 12/176,160 is a continuation-in-part and claims priority of U.S. patent application Ser. No. 10/237,333, now U.S. Issued U.S. Pat. No. 7,703,585, filed Sep. 5, 2002, which claims benefit of U.S. provisional patent application Ser. No. 60/392,802, filed Jun. 28, 2002, and U.S. provisional patent application Ser. No. 60/391,991, filed Jun. 25, 2002. Each of the aforementioned related patent applications is herein incorporated by reference in its entirety.

The application Ser. No. 12/176,160 is also a continuation-in-part and claims priority of U.S. patent application Ser. No. 11/560,403, now U.S. Issued U.S. Pat. No. 8,464,850, filed Nov. 16, 2006, which is herein incorporated by reference in its entirety The application Ser. No. 12/176,160 is also a continuation-in-part and claims priority of U.S. patent application Ser. No. 11/372,707, now abandoned, filed Mar. 10, 2006, which claims benefit of U.S. provisional patent application Ser. No. 60/667,495, filed Apr. 1, 2005. Each of the aforementioned related patent applications is herein incorporated by reference in its entirety.

The application Ser. No. 12/176,160 also claims benefit of U.S. provisional patent application Ser. No. 61/038,015, filed Mar. 19, 2008, which is herein incorporated by reference in its entirety.

BACKGROUND OF THE INVENTION

Field of the Invention

The present invention is generally related to the field of gas springs. More particularly, the present invention is related to a method and apparatus for altering the travel settings of gas springs and allowing equalization between the various gas chambers of a gas spring. Further included in the invention is a valve mechanism for controlling the fluid communication between the various gas chambers of the gas spring with turning of an adjustment knob or lever. The field of technology of these inventions is related to the technology described in, for example, U.S. Pat. Nos. 6,135, 434 and 6,311,962 whose contents are incorporated by reference in their entirety herein.

Description of the Related Art

Conventional automotive vehicles typically have separate suspension springs and separate simple shock absorbers. Simple shock absorbers, which provide damping only, are typically oil-filled cylinders within which a vented piston is mounted. The piston is connected to a shaft which extends out of one end of the cylinder. The outer end of the shaft is mounted to one point on the vehicle; the other end of the cylinder is mounted to another point on the vehicle so that the shock is parallel to the action of the suspension spring.

Another type of shock absorber, which is the type commonly used with motorcycles, off-road vehicles, competition automotive vehicles and off-road bicycles, combines at least part of the suspension function and the shock absorbing function in one unit. This second type of shock absorber commonly uses a spring unit to provide all or part of the suspension function coupled with a damping unit to provide the damping function. Conventional shock absorber designs commonly incorporate an external coil spring, an internal air spring, or an internal bladder to provide the suspension function.

SUMMARY OF THE INVENTION

The present invention is generally related to the field of gas springs. In one embodiment, a gas spring assembly for a suspension system includes a tube; a piston assembly slidably displaceable relative to the tube, the piston assembly separating the tube into a positive spring gas chamber and a negative spring gas chamber; and a valve mechanism configured to permit gas flow between the positive and negative spring gas chambers when the gas pressure in the negative spring gas chamber exceeds the gas pressure in the positive gas spring chamber.

In another embodiment, a valve mechanism for a gas spring suspension system having positive and negative spring gas chambers includes a gas passageway extending between the positive and negative spring gas chambers; a valve seat; and a valve displaced toward the valve seat to prevent gas flow through the gas passageway when the pressure in the positive spring gas chamber exceeds the pressure in the negative spring gas chamber, the valve displaced away from the valve seat to permit gas flow through the gas passageway when the pressure in the negative spring gas chamber exceeds the pressure in the positive spring gas chamber.

In another embodiment, a valve assembly for a suspension system includes a housing having a plurality of housing fluid flow paths through a housing wall thereof; a fluid conduit disposed adjacent the housing and having at least one conduit fluid flow path through a conduit wall thereof; a seal, located between two of the housing fluid flow paths and isolating a surface of the conduit wall from a surface of the housing wall; a first position wherein the conduit fluid flow path is in fluid communication with a first of the housing fluid flow paths and isolated from a second of the housing fluid flow paths; and a second position wherein the conduit fluid flow path is in fluid communication with the second of the housing fluid flow paths and isolated from the first of the housing fluid flow paths.

In another embodiment, a multi-position valve assembly includes a first tube having an axial fluid flow path through an interior thereof and a first aperture through a first tube wall and in communication with the flow path; a second tube substantially coaxially disposed relative to the first tube and having a plurality of second apertures through a second tube wall, at least two second apertures being spaced at a first distance apart, the first and the second tubes forming an annulus there between; a plurality of seals disposed in the annulus, at least one each of the seals being located on each side of each of the second apertures thereby forming a discreet annular chamber for each of the second apertures; a first position wherein the first aperture is in fluid communication with a first of the chambers and a second position wherein the first aperture is in fluid communication with a second of the chambers and wherein a distance between the first and second positions is less than half of the first distance.

In another embodiment, a gas spring suspension system includes a tube; a piston assembly disposed within and movable relative to the tube; a first spring gas chamber and a second spring gas chamber; and a valve mechanism selectively permitting gas flow between the first and second spring gas chambers.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 2A-FIG. 2C depict simplified cross-section dynamic equalization views of the gas spring. FIG. 2B is a cross section along line 2B-2B of FIG. 2A. FIG. 2C is a cross section along line 2C-2C of FIG. 2A.

FIGS. 6A, 6B, and 6C depict simplified schematic static equilibrium views of a gas spring according to another exemplary embodiment of the present invention.

FIGS. 7A, 7B, 7C depict detailed assembly views of various flow paths available in a gas spring according to the exemplary embodiment of the present invention.

FIG. 16A-16B depict an exemplary check valve with a faster response than the check valve of FIG. 15 and used in the gas spring of FIG. 6.

Finally, the following symbolic conventions have been used throughout the drawings where applicable:

a) dense cross-hatching indicates higher pressures than less-dense cross-hatching;

b) filled circles represent closed valves or openings.

DETAILED DESCRIPTION

Introduction

With reference to the drawings, an exemplary embodiment of a gas spring with travel control will now be described.

Figure 1C:
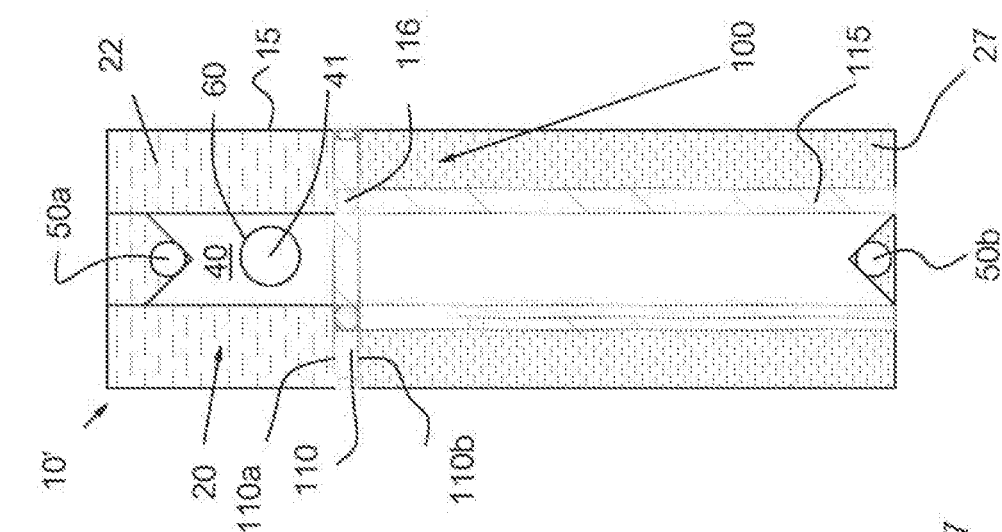
FIGS. 1A, 1B, and 1C depict simplified cross-section static equilibrium views of a gas spring according to an exemplary embodiment of the present invention.
Figure 1B:
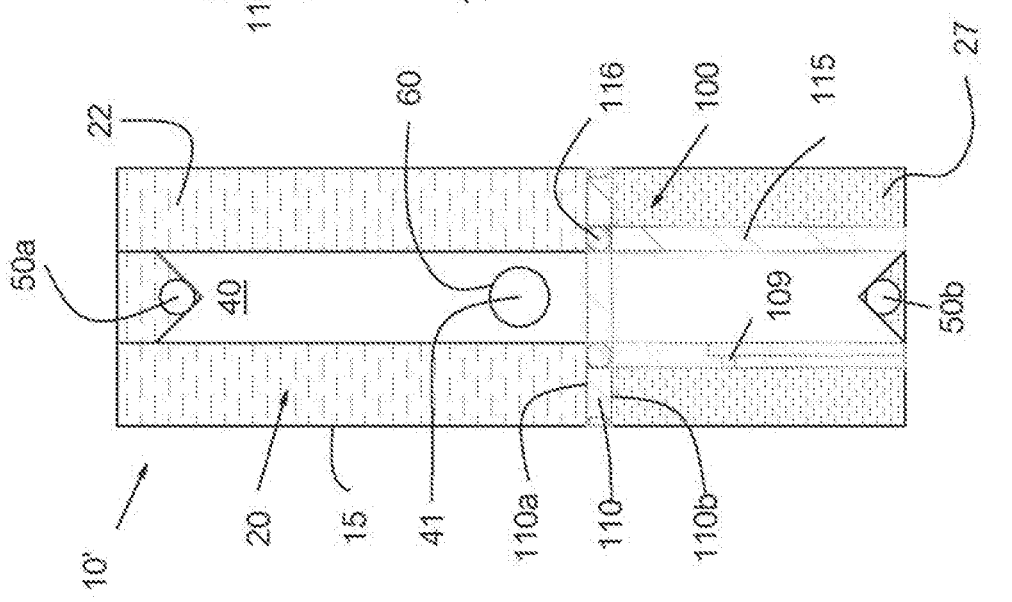
Figure 1A:
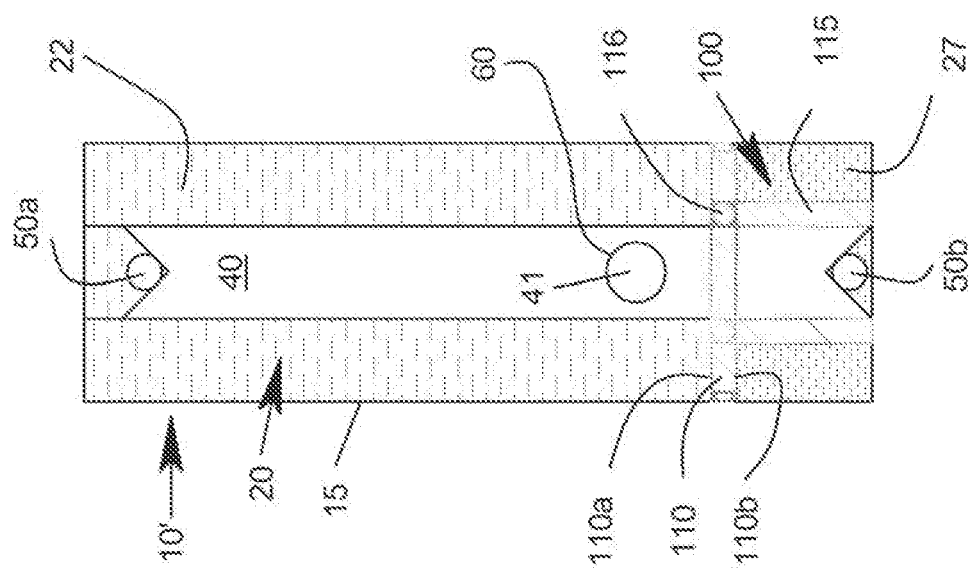

FIGS. 1A, 1B, and 1C depict simplified cross-section and static equilibrium views of a gas spring 10' according to an exemplary embodiment of the present invention. This gas spring 10' is an application for which the valve and valve control unit according to the teachings of the invention would be very suitable.

In particular, these figures depict, in a static state (i.e., at rest), a gas spring 10' in a variety of travel mode positions. As used herein, "gas spring" may refer to, at least, a rear shock or a subcomponent of a front fork of a bicycle. However, the invention is not so limited. As will be further described, the gas spring will typically comprise a gas spring having a gas tube divided into positive and negative gas chambers by a piston.

Basic Valve Structure

Figure 11:
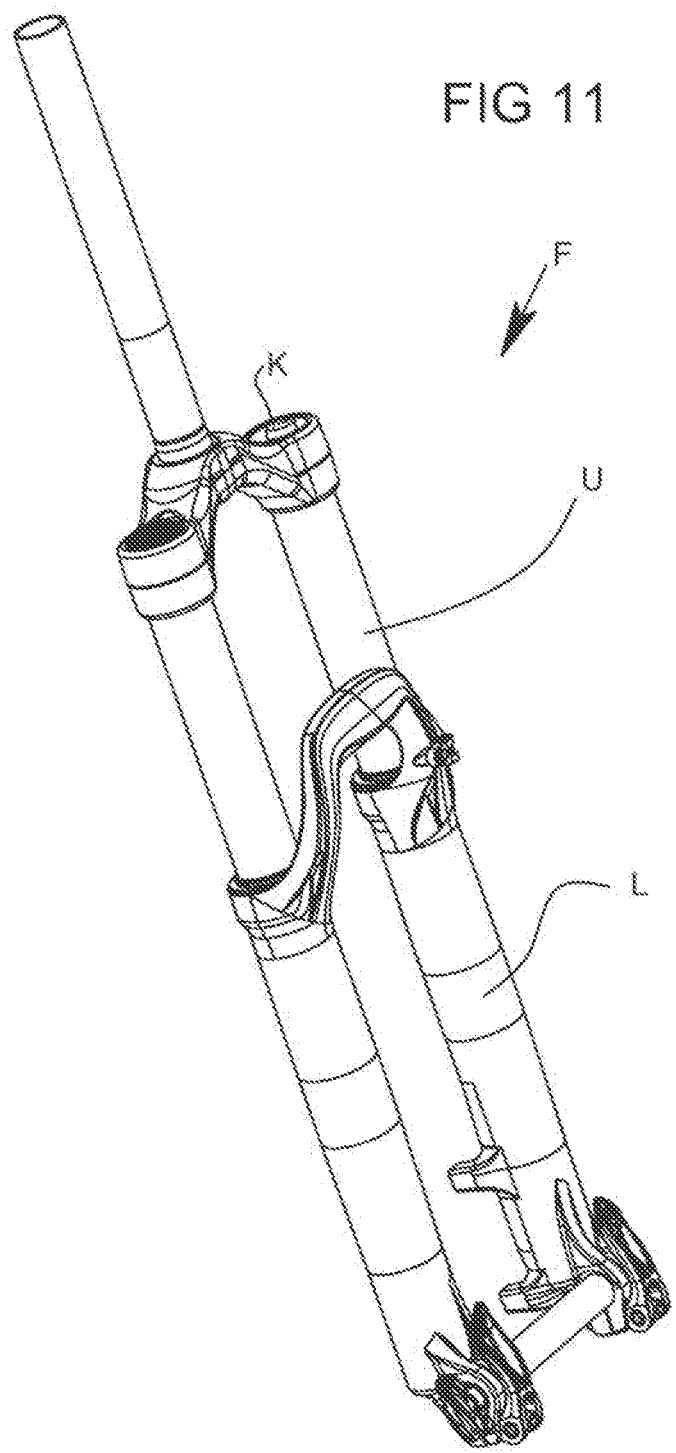
FIG. 11 is a perspective view of a bicycle fork including the gas spring according to the exemplary embodiment of the present invention.

As previously mentioned, the most basic form of the gas spring 10' is shown in FIGS. 1A-C as well as FIGS. 2A-C and includes a gas spring body 15 having a longitudinal axis and defining an internal gas chamber 20. When the gas spring 10' is being used in a bicycle fork, gas spring body 15 will be a subcomponent contained within upper leg U of fork F (FIG. 11).

Figure 15A:
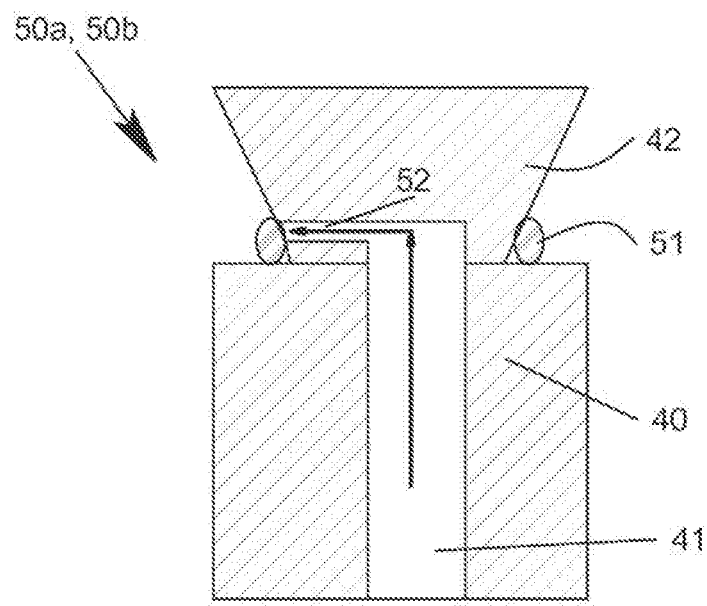
FIG. 15A-15B depict an exemplary check valve used with the gas spring of FIG. 1.
Figure 15B:
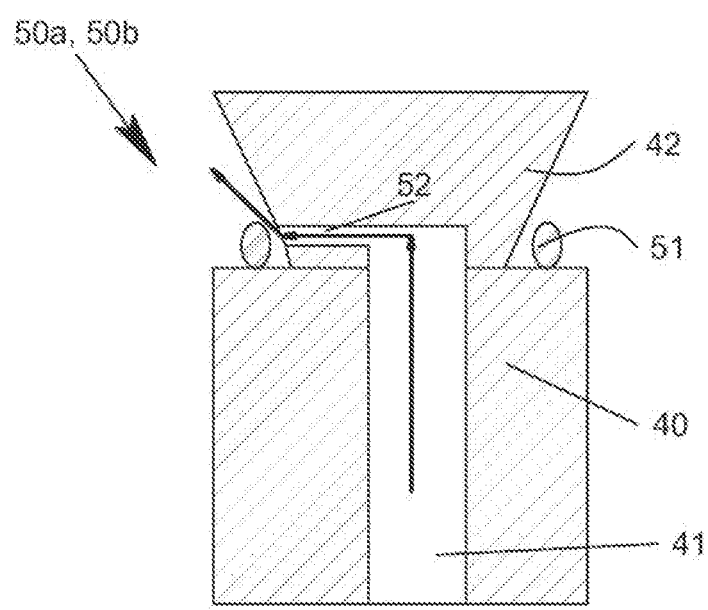

A hollow valve rod 40 having a hollow interior portion or fluid path 41 therein is provided within the internal gas chamber 20 and parallel to the longitudinal axis of the gas spring body 15. As used herein, "fluid" refers to a gas, such as air or nitrogen. The hollow valve rod 40 is open at both ends and provided with check valve 50a and check valve 50b to selectively seal off the fluid path 41 so that fluid may only leave the fluid path 41 through check valve 50a or check valve 50b, i.e., fluid may not enter fluid path 41 through check valve 50a or check valve 50b. FIG. 15A-15B depict a check valve 50a and check valve 50b, in more detail. In particular, check valve 50a and check valve 50b comprise a small vent hole 52 in fluid communication with fluid path 41 and positioned in a closed head portion 42 of hollow valve rod 40. An elastomeric o-ring 51 surrounded the head portion 42 and when in its relaxed position (FIG. 15A) blocked small vent hole 52. When the pressure of the gas flowing through fluid path 41 and small vent hole 52 is large enough, the pressure causes elastomeric oring 51 to deform/expand (FIG. 15B) and unblock small vent hole 52, thereby allowing gas to escape from fluid path 41.

Figure 14A:
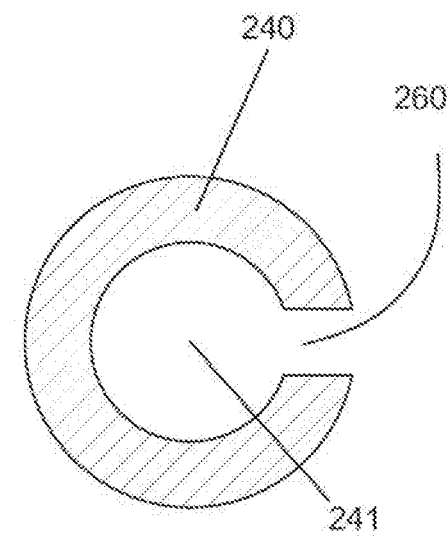
FIG. 14A-14C depict various configurations for the through hole for the valve rod.
Figure 14B:
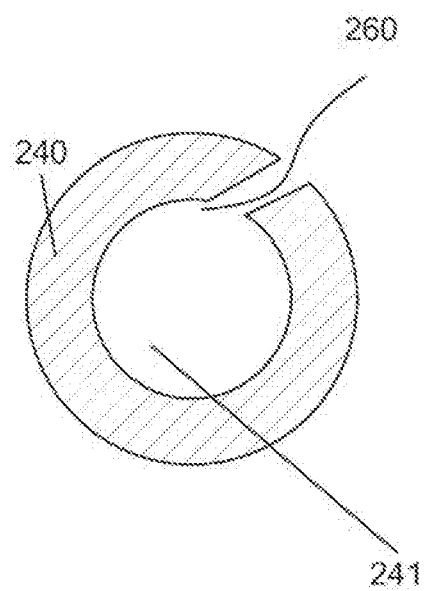
Figure 14C:
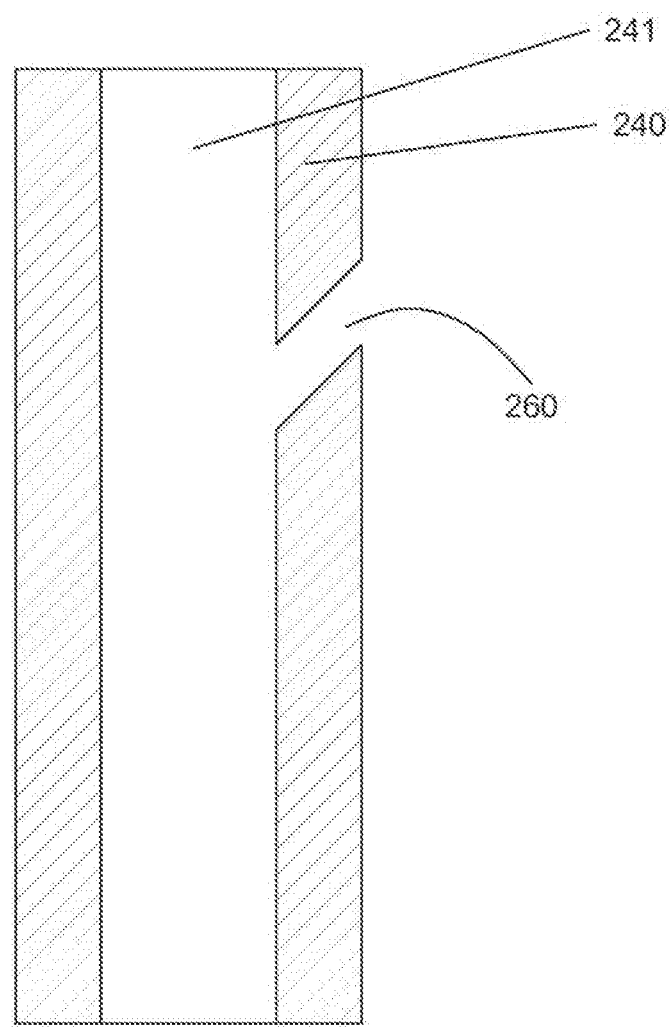

Accordingly, to accelerate gas flow during equalization stages, the hollow valve rod 40 is also provided with at least one through hole 60 (only one of which is consistently shown herein for clarity purposes and not as an intent to limit the invention in any way), typically located in a depression 61 (see FIG. 2A, 2C) and therefore in the form of a depressed radial through hole 60, to provide for completely open (non-checked) fluid communication between the internal gas chamber 20 and the fluid path 41 of the hollow valve rod 40. In FIGS. 14A-14C, various other potential configurations of through hole 60 are depicted in which through hole 60 is not necessarily radial (the depression 61 is omitted for clarity, as it has been from most of the FIGS. herein).

Through any conventional mechanism (not shown), such as a screw mechanism, connected to a conventional adjuster in the form or a knob K (FIG. 11) or lever (not shown) and collectively sometimes referred to herein as a "knob" positioned outside the gas spring body 15 (or fork F), the height of the through hole 60 may be adjusted by the user without having to open the gas spring body 15. While it is possible to have the height of the radial through hole 60 be infinitely and continuously adjustable between the long and short travel mode positions, in reality, there may be a plurality of discrete positions, such as 15 discrete positions within 3.5 rotations of knob K allowing for suspension travel between 90-130 mm, or as large as 110-150 mm (however, any travel range is possible). Thus, in long travel mode (FIG. 1A), the through hole 60 is located deep in the gas spring body 15 and in short travel mode (FIG. 1C), the through hole 60 is located towards the top of the gas spring body 15. For medium-travel mode (FIG. 1B), the through hole 60 may be located anywhere between the short and long travel mode positions.

Piston Assembly Structure

A moveable piston assembly 100 is also provided within the internal gas chamber 20 and divides the internal gas chamber 20 into first variable volume gas chamber 22 and second variable volume gas chamber 27, respectively. Moveable piston assembly 100 is rigidly mounted to lower leg L of fork F and mounted for relative movement with respect to hollow valve rod 40 which is rigidly mounted to upper leg U of fork F. As moveable piston assembly 100 longitudinally moves within internal gas chamber 20 along hollow valve rod 40, one of gas chambers 22, 27 will get larger and the other of gas chamber 22, 27 will get smaller, depending on the direction of movement of moveable piston assembly 100. Moveable piston assembly 100 primarily includes the main piston body 110 and collar portion 115. Moveable piston assembly 100 also includes vent 109, for reasons to be described later. Collar portion 115 of the moveable piston assembly 100 eventually leaves the gas spring body 15 and, in the case of a fork, leaves upper tube U through a seal (not shown) and is affixed to the lower end of lower tube L of fork F (FIG. 11).

As previously mentioned, hollow valve rod 40 and moveable piston assembly 100 are mounted for relative movement with respect to each other and typically that would involve the ability of hollow valve rod 40 to collapse into a bore within the center of the main piston body 110 (See FIGS. 2A-2C) as the upper U and lower L legs of the fork telescope relative to each other. To create a seal between the moveable piston assembly 100 and the hollow valve rod 40 so there is no fluid communication between the first gas chamber 22 and second gas chamber 27 in the area where the moveable piston assembly 110 is mounted on the hollow valve rod 40, a seal, preferably in the form of an o-ring 116 is provided within the bore of the main piston body 110. For reasons to be described later, the thickness of this o-ring 116 may be less than the length of the depression 61 containing through hole 60.

Main piston body 110 has an upper surface 110$a$ and a lower surface 110$b$. The relative sizes of the surface areas of these two surfaces of the main piston body 110 may be such that the lower surface 110$b$ of the main piston body 110 may have a smaller surface area than the upper surface 110$a$. Typically, the ratio of upper surface 110$a$ area $[if (A1)]^2$ to lower surface 110$b$ area $(\pi[(A1)^2-S^2])$ is approximately 1.5:1 (the attached schematic figures are therefore, not to scale). Accordingly, when the gas spring 10 is in static equilibrium and the forces on both sides of the moveable piston assembly 100 are equal, according to the formula P=F/A, due to the fact that the surface areas on each side of moveable piston assembly 100 are different, the pressure inside the second gas chamber 27 may be higher than the pressure in the first gas chamber 22.

Basic Pressure Equalization

The basic pressure equalization operation of the gas spring 10' will now be described with reference to FIGS. 2A-2C. During compression of the gas spring 10', the moveable piston assembly 100 will move relative to the hollow valve rod 40 and therefore also with respect to the through hole 60.

Whenever the portion of the hollow valve rod 40 including the through hole 60 travels into the bore of the main piston body 110 to the point where the o-ring 116 overlaps depression 61 and through hole 60 (FIG. 2A, 2C), dynamic venting and equalization occurs. Because depression 61 of through hole 60 may have a larger diameter than the thickness of the o-ring 116, a vent is created that allows for very rapid fluid communication between the first gas chamber 22 and second gas chamber 27. This very rapid fluid communication is represented by arrow Q and may be much faster than that which could be achieved by the possible flow of fluid through fluid path 41 and out check valve 50$a$ and check valve 50$b$. During this dynamic operation, the high-pressure gas chamber will vent to the lower pressure gas chamber. In the dynamic examples of FIGS. 2A, 2C, first gas chamber 22 is the high pressure chamber and vents to the lower pressure second gas chamber 27 through vent 109. There will be a pressure drop in the first gas chamber 22 and a pressure rise in the second gas chamber 27. According to the formula P=F/A, with force directly proportional to pressure, the decreased pressure on upper surface 110$a$ will result in a decreased force on upper surface 110$a$ and increased pressure on lower surface 110$b$ will result in an increased force on lower surface 110$b$ and therefore there will be an unbalanced force upward, i.e., compression. Thus, the gas spring will expand towards its rest equilibrium position, which occurs when the forces on both sides of main piston body 110 are equal.

Travel Adjust (Long Travel to Short Travel)

Figure 3C:
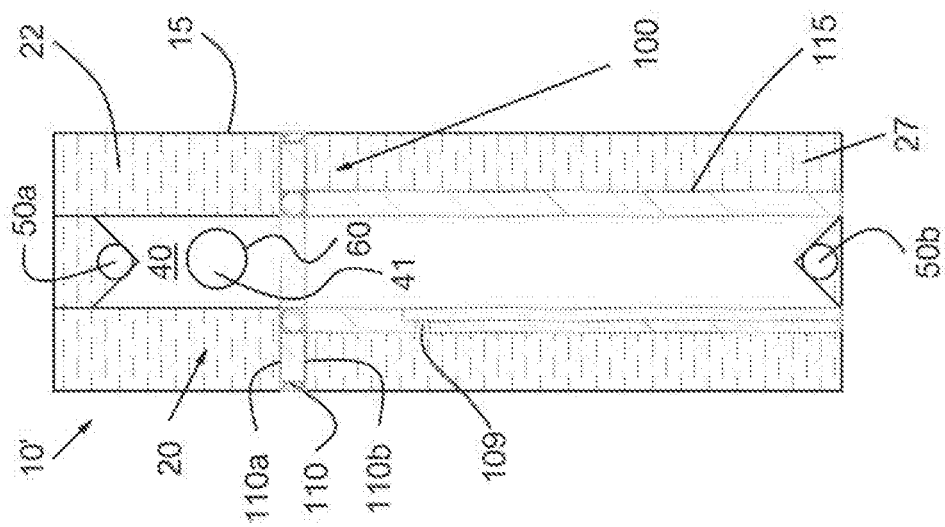
FIGS. 3A, 3B, and 3C are simplified cross-sections depicting the process of converting the gas spring from long travel to short travel.
Figure 3B:
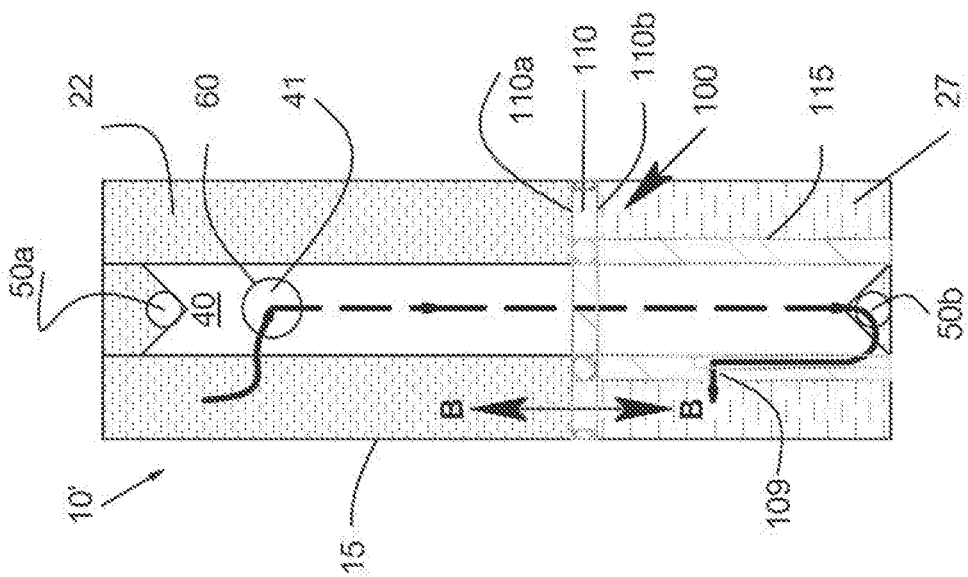
Figure 3A:
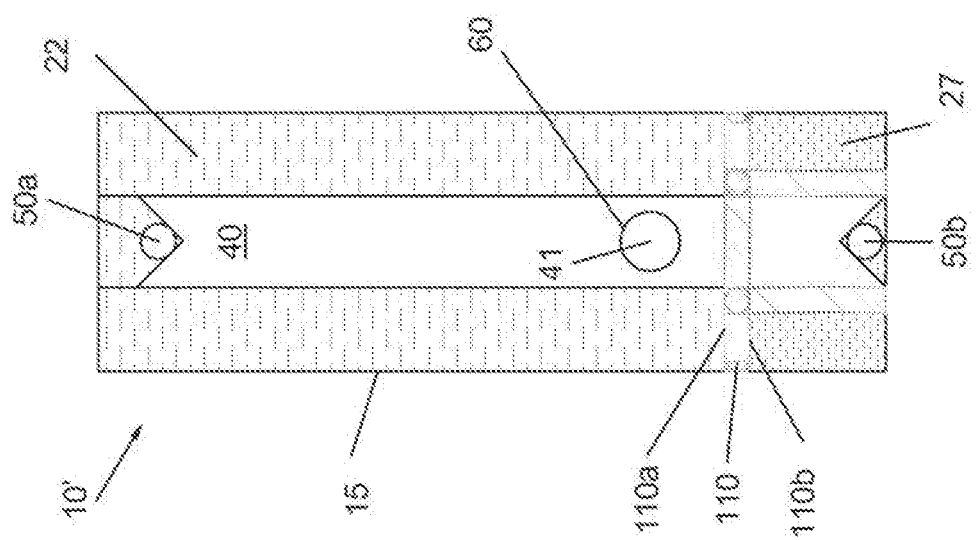

FIGS. 3A-3C depict how the gas spring 10' can be converted from long travel mode to short travel mode using a gas mechanism. FIG. 3A depicts static gas spring 10' in long travel mode. Accordingly, the moveable piston assembly 100 is located low in the internal gas chamber 20 and through hole 60 is positioned close above it. In the static position, the pressure in the second gas chamber 27 is higher than the pressure in the first gas chamber 22. The user then converts the gas spring 10 to short travel mode by turning an external knob K that results in the moving of the through hole 60 further towards the top of the internal gas chamber 20. However, as the mere moving of the through hole 60 does not directly affect the pressures or forces in either of the first gas chamber 22 or second gas chamber 27, the moveable piston assembly 100 does not move to the new travel mode position without additional assistance. Therefore, as shown in FIG. 3B, the user would, for example, preferably pump the moveable piston assembly 100 a few times as symbolized by the double-headed arrow B-B in the FIG. During the downward movement of gas spring body 15 relative to the moveable piston assembly 100:

A. The gas in first chamber 22 increases in pressure and is forced from first gas chamber 22 into through hole 60 and fluid path 41 of the hollow valve rod 40. Since check valve 50a only allows fluid flow out of fluid path 41, the gas then exits the hollow valve rod 40 by opening check valve 50b and enters second gas chamber 27 (whose pressure has temporarily decreased) via vent 109 in the moveable piston assembly 100 (recall this a simplified schematic representation). Accordingly, the pressure in the second gas chamber 27 will increase; and B. With an increase in pressure in the second gas chamber 27 due to the pumping, an upward force will result on the lower surface 110b of the main piston body 110 and the moveable piston assembly 100 will move upward into the new equilibrium point in a short travel mode position (FIG. 3C) where the pressure in second gas chamber 27 exceeds the pressure in first gas chamber 22.

Travel Mode Adjust (Long Travel to Short Travel)

Figure 4C:
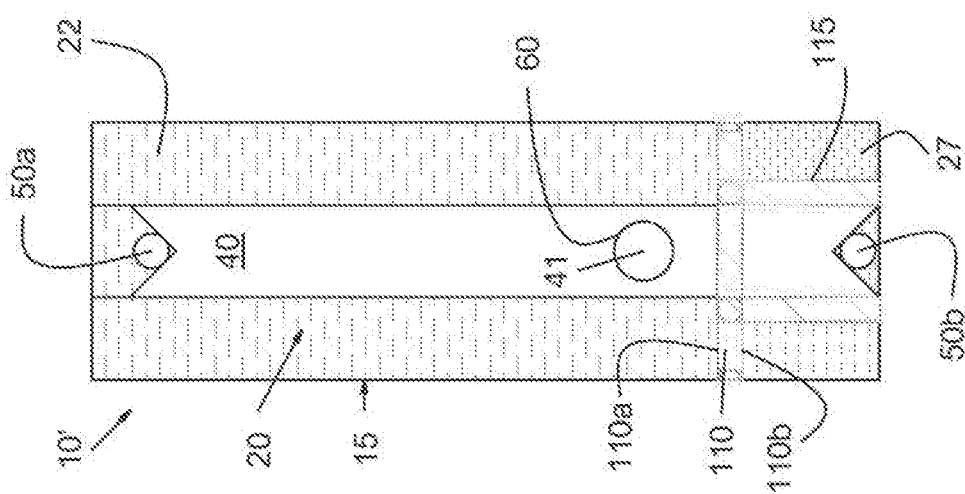
FIGS. 4A, 4B, and 4C are simplified cross-sections that depict the process of converting the gas spring from short travel to long travel.
Figure 4B:
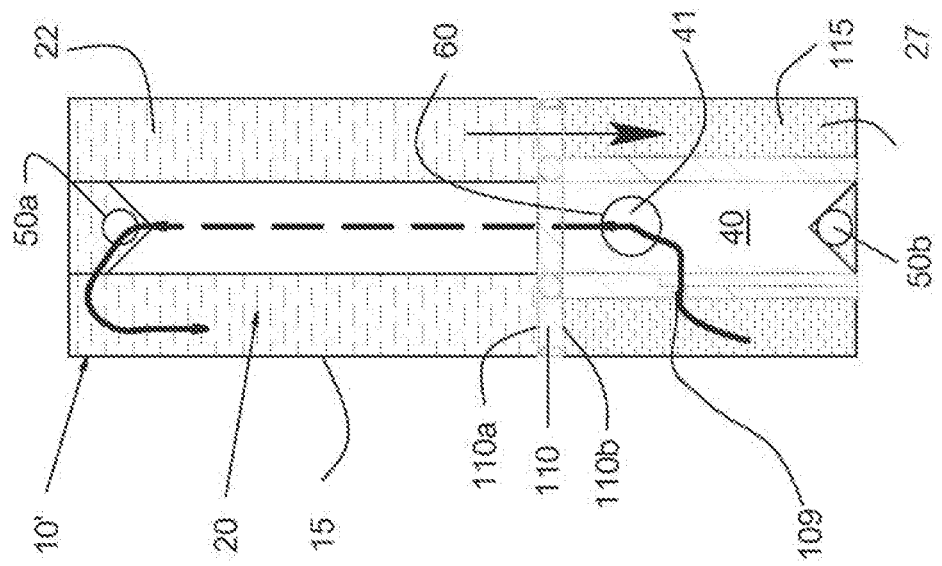
Figure 4A:
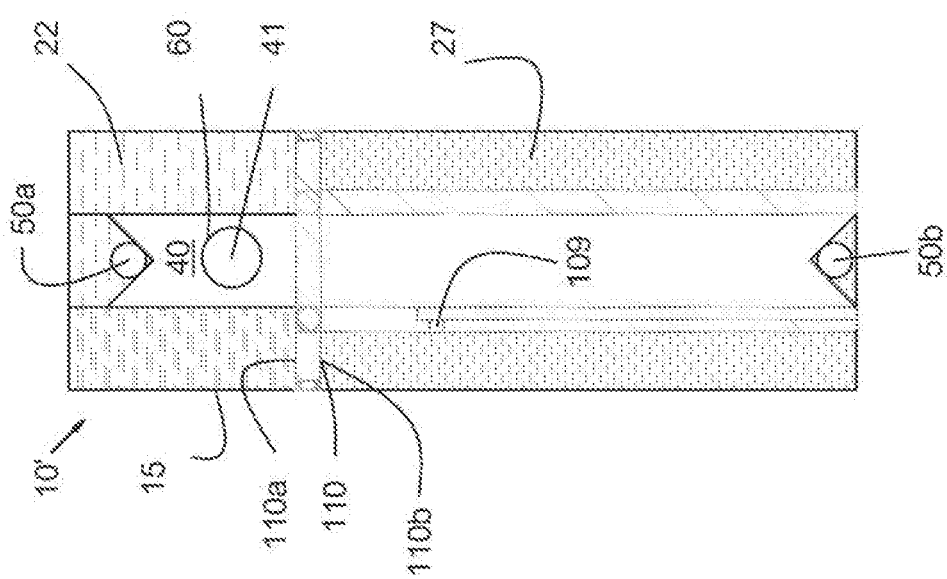

FIG. 4A-4C depict how the gas spring 10' can be converted from short travel mode to long travel mode. FIG. 4A depicts static gas spring 10' in short travel mode. Accordingly, the moveable piston assembly 100 is located high in the internal gas chamber 20 and through hole 60 is positioned close above it. In this static position, the pressure in the second gas chamber 27 is higher than the pressure in the first gas chamber 22. The user then converts the gas spring 10 to long travel mode by turning an external knob K that results in the moving of the through hole 60 further towards the bottom of the internal gas chamber 20. This has the result of moving the through hole 60 from the lower pressure first gas chamber 22 to the higher-pressure second gas chamber 27. Via the vent 109 in the moveable piston assembly 100, the fluid path 41 of the hollow valve rod 40 will have the pressure of the second gas chamber 27. Because the pressure on the first gas chamber 22 side of the check valve 50a will be less than on fluid path 41 side, the check valve 50a will open and gas will flow from the second gas chamber 27 to the first gas chamber 22. This results in a pressure drop in the second gas chamber 27 and a pressure increase in the first gas chamber 22. This ultimately results in a downward force on the upper surface 110a of the main piston body 110 and the moveable piston assembly 100 will accelerate downward to the new equilibrium point in a long travel mode position (FIG. 4C) where the pressure in second gas chamber 27 still will exceed the pressure in first gas chamber 22. Note that unlike the change from long travel mode to short travel mode, the change from short travel mode to long travel mode does not require any pumping on the gas spring 10 since the moving of the through hole 60 into the high pressure second gas chamber 27 creates the necessary pressure differential.

Introduction to Another Exemplary Embodiment of the Invention

In particular, while it may seem that having a large or infinite number of travel positions between long and short may be optimal, a rider may not need such a wide range of positions. Accordingly, another embodiment involves incorporating a discrete number of predetermined travel mode positions to the gas spring, preferably: long travel (L), medium travel (M), and short travel (S) modes.

Additionally, when the gas spring 10' has been incorporated in a front fork of a bicycle, the typical distance between through hole 60 in the long travel mode position and short travel mode position may be between 40-45 mm, but can vary widely between manufacturers. Using the maximum available thread pitch that would not mechanically bind, it may still take a plurality of complete turns, such as three, of the adjustment knob K to bring the radial hole from the long travel mode position to the short travel mode position for a 45 mm travel change. Having to make a plurality of complete turns during a ride may be impractical for a rider. Accordingly, another embodiment of the invention additionally involves the ability to make drastic incremental travel adjustments with only a small angular turn of an adjustment knob; preferably 90°, and typically no more than 240° of rotation (since more than 240° would require a release and re-grip of the knob).

Figure 5:
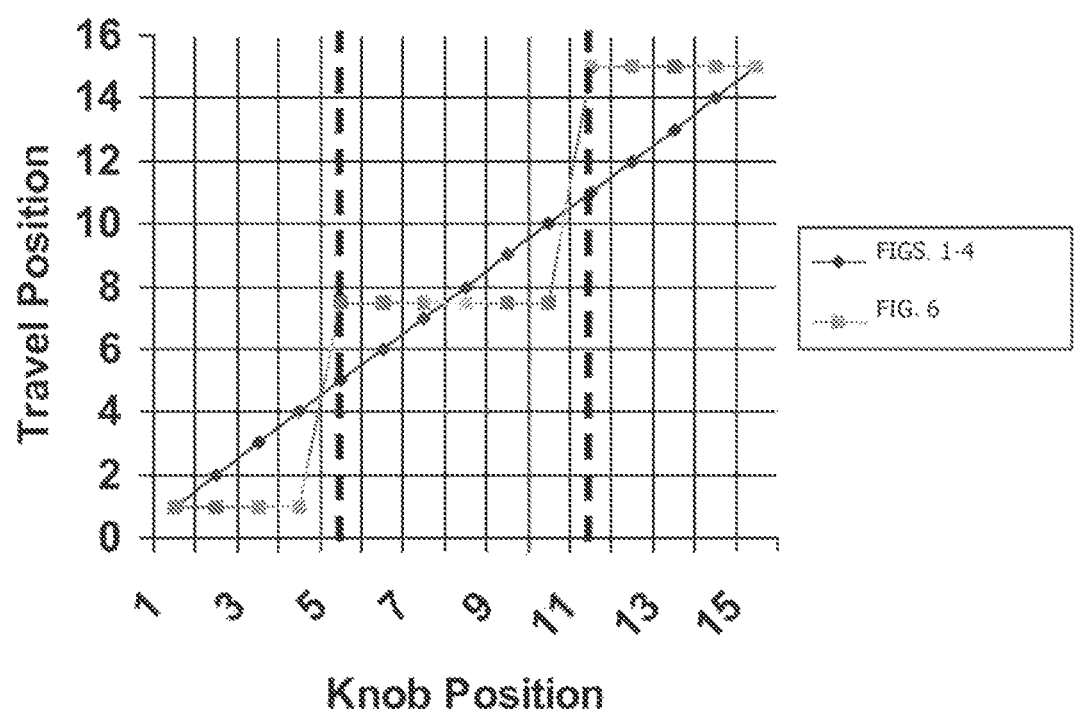
FIG. 5 are graphs comparing the travel adjustment of the gas spring with the travel adjustment of a gas spring according to another exemplary embodiment of the present invention.

The travel mode adjust of another embodiment of the invention may be considered a much more non-linear or non-proportional travel adjust than those of the gas spring 10'. This is depicted by the graph of FIG. 5. In FIG. 5, in the travel adjust of the gas spring 10' having 15 discrete knob settings corresponding to 15 different and discrete travel levels, the turning of the knob appears to create almost a linear change in the travel of the fork. In FIG. 5, in the travel adjust according to another embodiment, where there are 3 discrete knob settings corresponding to 3 different and discrete travel modes, but covering the same overall amount of linear travel, the turning of the knob creates a much more stepped and non-linear change in the travel of the fork.

Valve Rod

As schematically shown in the static equilibrium views of FIG. 6A-6C, a valve rod assembly 240 may have three through holes, preferably in the form of three preferably radial through holes, 260a, 260b, 260c corresponding to predetermined damper travels, namely: short travel mode, medium travel mode, and long travel modes, respectively. The same variability concerning the structure and number of through holes 60 discussed above applies to through holes 260. However, these through holes: (1) need not be in a depression for reasons to be described below and (2) do not provide direct access to the interior of the valve rod assembly 240 and hollow interior portion or fluid path 241 of the gas spring 10 and as pictorially depicted in the FIGS. by the solid fill, at least two of the through holes 260 will always be sealed off from fluid communication with the fluid path 241 of the valve rod assembly 240.

The structure of the valve rod assembly 240 is more clearly shown in FIGS. 7A-7C. In particular, valve rod assembly 240 may comprise: (a) an outer valve rod 242 having a hollow interior and (b) a valve control assembly including: valve tubes 245, valve ring 246, and inner valve rod 255. The valve tubes 245 and valve ring 246 are primarily for structural rigidity of the valve rod assembly 240 and for supporting the seals, as described below. Inner valve rod 255 has generally closed walls that surround fluid path 241 except for at least one valve rod bore 257 and openings at its ends that are sealed off by check valves 250a, 250b (see FIGS. 12A-B, 13A-B, 16A-B), similarly as previously described with respect to the gas spring 10'. However, check valves 250a, 250b are designed to operate much more rapidly than check valve 50a and check valve 50b, and therefore they can be used in place of depression 61 during the equalization process. FIG. 16A-16B depict these check valves 250a, 250b, in more detail. In particular, check valves 250a, 250b may comprise a small ball bearing 252 blocking fluid path 241 of inner valve rod 255. An elastomeric o-ring 251 surrounds the exit to fluid path 241 to create a good seal when the check valve is in its closed position (FIG. 15A) and a spring 253 biases ball bearing 252 into the seat of o-ring 251. When the pressure of the gas flow Q through fluid path 241 is large enough, the spring 253 forces can be overcome and the ball bearing 252 unseated (FIG. 16B), thereby allowing the gas flow Q to escape from fluid path 241. Spring 253, which is highly responsive, coupled with the fairly large flow path that is created when the valve opens results in a check valve that operates more rapidly than that of the check valves 50a,b as well as with less pressure differential across the valve.

Furthermore, as with the gas spring 10', inner valve rod 255 may rotate and move longitudinally to cause longitudinal movement of the at least one valve rod bore 257 relative to valve tube 242 (compare FIGS. 7A-7C). While the drawings depict only one valve bore 257, one skilled in the art would recognize that there may be more than one valve bore 257, so long as all the valve bores 257 are at substantially the same height.

Each valve tube 245 is trapped in between the outer and inner valve tubes 242, 255 by an outer seal 271 and an inner seal 270. These seals will typically be in the form of o-rings. Each valve tube 245 will also have one or more through bores 280a, 280c, preferably, corresponding to through holes 260a, 260c. Because valve tubes 245 are smaller than the space between the inner valve rod 255 and the outer valve rod 242, gas gaps 285a, 285c that create a venting passageway are formed there between. Finally, as previously mentioned, in between inner seals 270 is valve ring 246. Because valve ring 246 is smaller than the space between the inner valve rod 255 and the outer valve rod 242, a gas gap 285b that creates a venting passageway is formed there between also. However, unless the valve rod bore 257 is aligned to provide fluid communication with a particular gas gap, that gas gap is sealed off from the fluid path 241.

Travel Mode Control

Thus, for example, in FIG. 7A, gas may enter the valve rod assembly 240 through any of the through holes 260a, 260b, or 260c, flow through their respective through bores 280a, 280b, or 280c, and into their respective gas gaps 285a, 285b, or 285c. For the example of FIG. 7A, the gas spring is set to medium travel and therefore, valve rod bore 257 is aligned with gas gap 285b. Thus, gas coming into the valve rod assembly 240 from gas gaps 285a, 285c can go no further due to inner seal 270 and outer seal 271 and the fact that valve rod bore 257 does not provide fluid access between gas gaps 285a, 285c and fluid path 241. However, gas may enter the valve rod assembly 240 through hole 260b for the mid travel setting, flow through the valve ring 246, into the gas gap, 285b, and then through valve rod bore 257 into the fluid path 241 of inner valve rod 255. The gas will then travel to the appropriate valve and chamber.

For the examples in FIGS. 7B and 7C, gas also enters the valve rod assembly 240 through all of the through holes 260a, 260b, and 260c, flow through their respective through bores 280a, 280b, and 280c, and into their respective gas gaps 285a, 285b, and 285c. For the example of FIGS. 7B and 7C, however, the gas spring is set to one of either short or long travel modes, respectively, and therefore, valve rod bore 257 is aligned to provide fluid communication between fluid path 241 and gas gap (e.g.) 285a or 285c. Gas may enter the valve rod assembly 240 through hole 260a or 260c for the selected travel setting, flow through the corresponding gas gap, 285a or 285c, and then through valve rod bore 257 into the fluid path 241 of inner valve rod 255. The gas will then travel to the appropriate valve and chamber.

Figure 8:
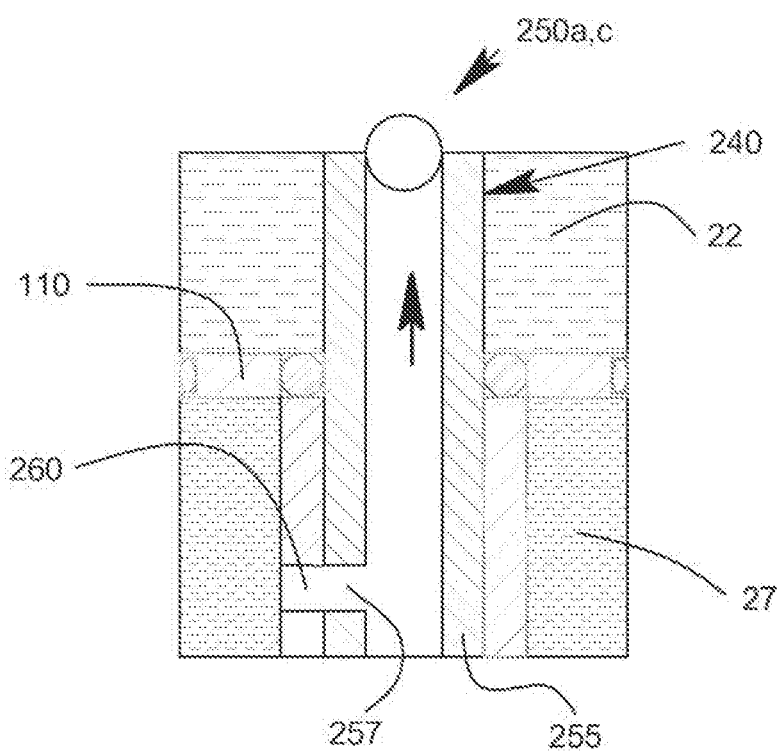
FIG. 8 depicts another method in which dynamic venting may be achieved.
Figure 9:
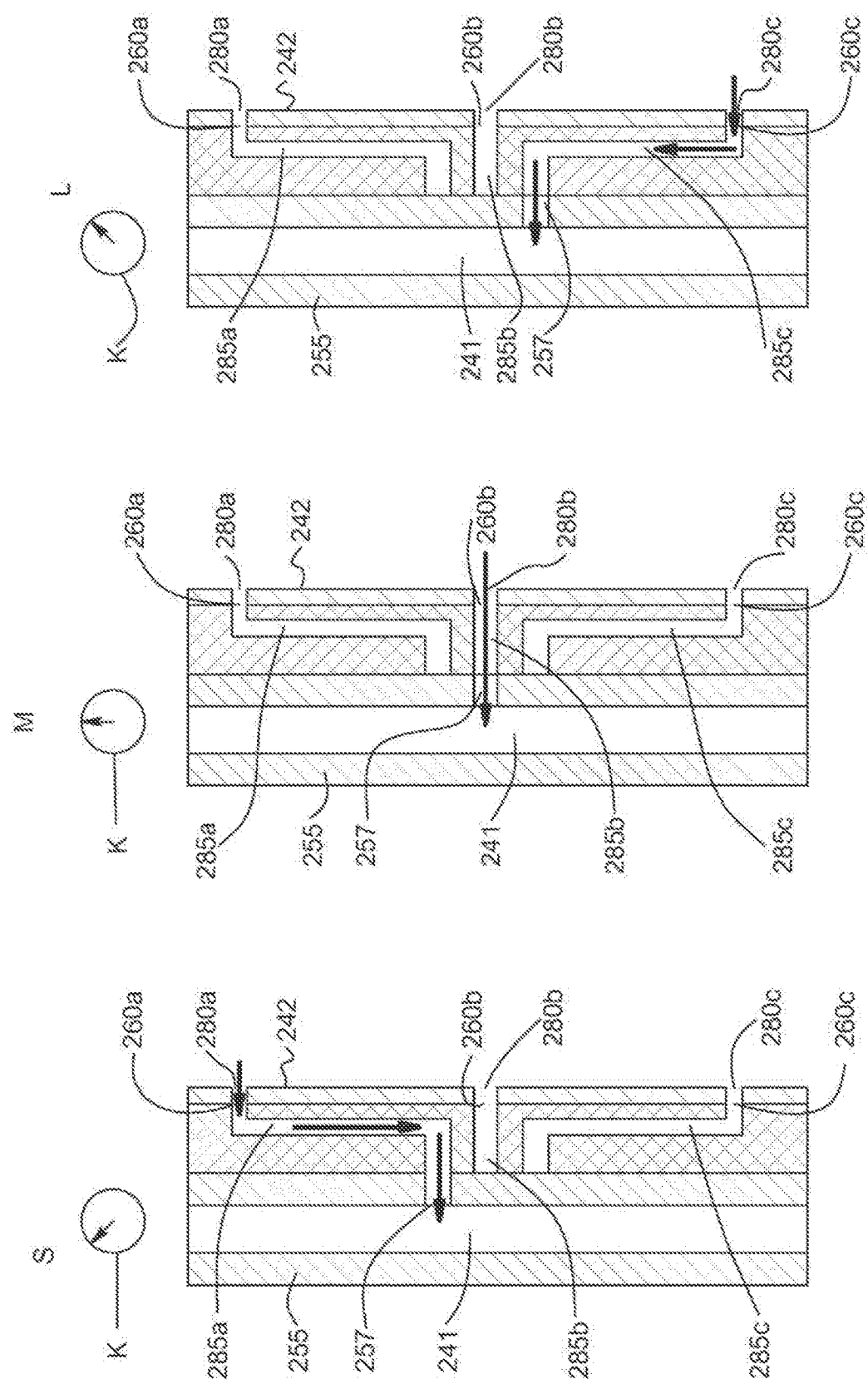
FIGS. 9A, 9B, and 9C schematically depict various gas flow paths available in a gas spring according to the exemplary embodiment of the present invention.

This operation is shown schematically in FIG. 9A-9C (FIG. 8 described below), which also more clearly shows how the method of the invention allows the function and result of moving a radial bore across a very long travel can be achieved without actually having to do so. That is, through less than one complete turn of the adjustment knob K, and preferably approximately 90° rotation of the knob, what can be achieved is the same as three complete turns of an extremely sharply pitched shaft that would be very close to binding due to the sharpness of the pitch.

In FIG. 9A, the gas spring is configured for short (S) travel mode. Accordingly, a flow path is open between fluid path 241 of inner valve rod 255 and bore 280a.

In FIG. 9B, the gas spring is configured for medium (M) travel mode. Accordingly, a flow path is open between fluid path 241 of inner valve rod 255 and bore 280b.

In FIG. 9O, the gas spring is configured for long (L) travel mode. Accordingly, a flow path is open between fluid path 241 of inner valve rod 255 and bore 280c.

Figure 10:
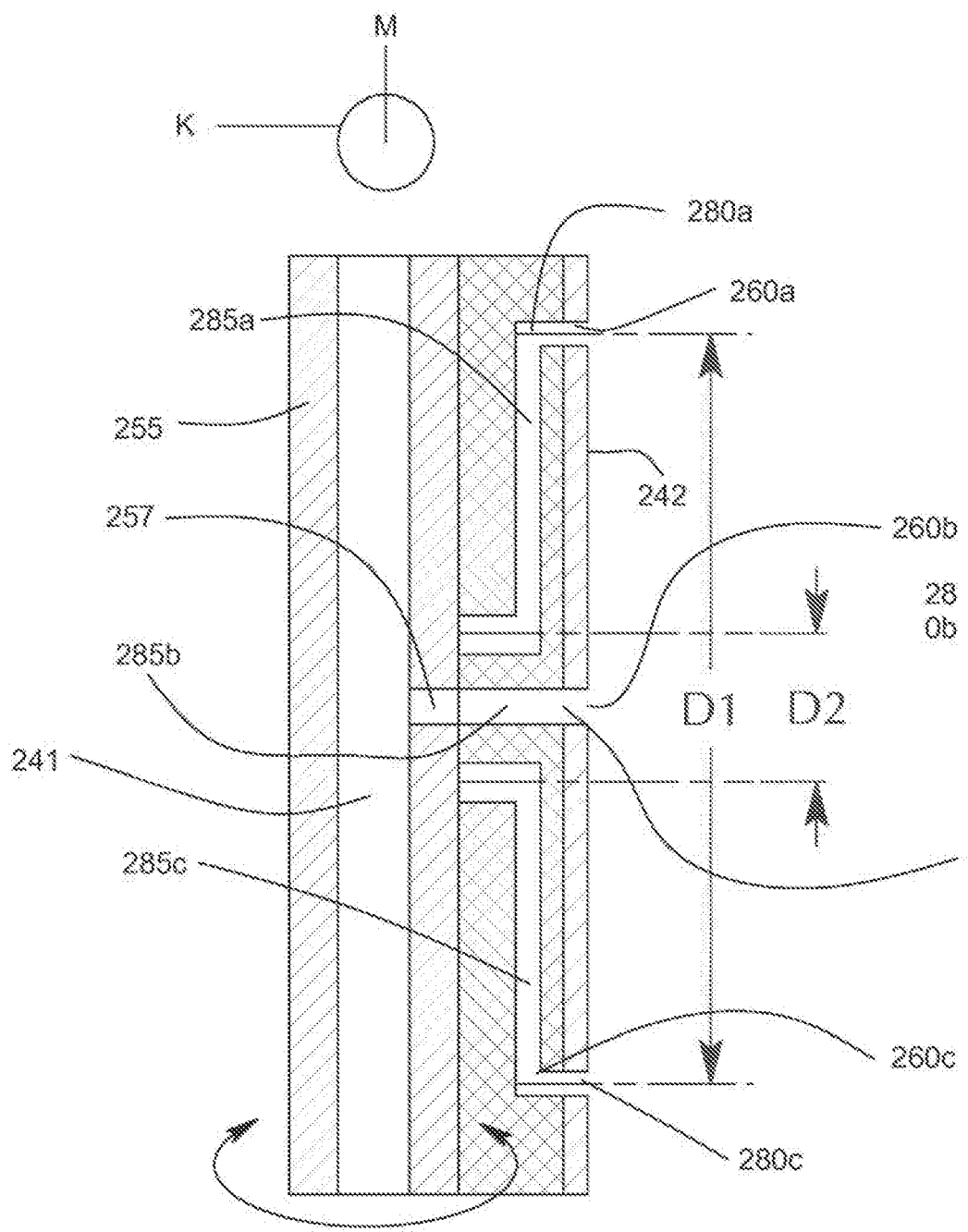
FIG. 10 is another simplified schematic depicting various gas flow paths available in a gas spring according to the exemplary embodiment of the present invention.

This all is summarily showed in FIG. 10. For the gas spring 10', the valve rod would have to be rotated a sufficient number of times with a thread pitch sufficient to move the radial hole a longitudinal distance D1, approximately equal to 45 mm. However, with the design according to another embodiment, the valve rod bore 257 only has to be rotated a sufficient number of times with a pitch sufficient to move the radial hole a longitudinal distance D2, approximately equal to 2.7 mm, substantially less than the longitudinal distance between now fixed bores 280. These distances are also highlighted in FIGS. 7A-7C. This can be achieved through less than one complete turn of the adjustment knob K, and preferably approximately 90' rotation of the knob and a less severe thread pitch. This makes the ability to make the travel adjustment much more user-friendly.

As previously mentioned, through holes 260 need not be located in depressions in the way that through hole 60 are. Nor, do they have to be larger than oring 116. Rather, it is possible that as shown in simplified FIG. 8, dynamic venting (cf. FIG. 2C) is achieved by the overpressure of second chamber 27 directly entering into fluid path 241 through an open through hole 260 and valve rod bore 257 and then up to and out of check valve 250a and into first chamber 22 (latter part not shown in FIG. 8). This process can occur just as rapidly as the venting through the depression of FIG. 2C due to the quick response of check valves 250a.

Figure 12C:
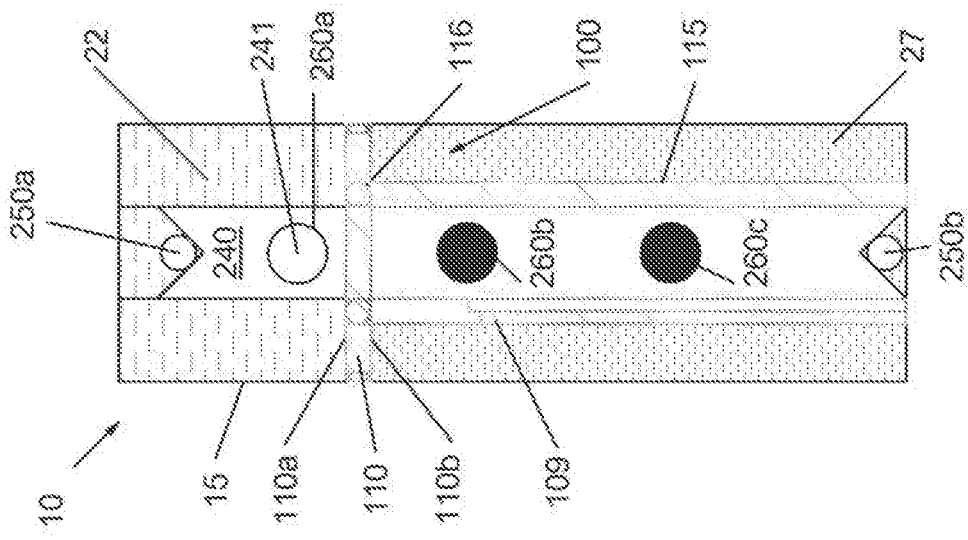
FIGS. 12A, 12B, and 12C depict the process of converting a gas spring according to the exemplary embodiment of the present invention from long travel to short travel.
Figure 12B:
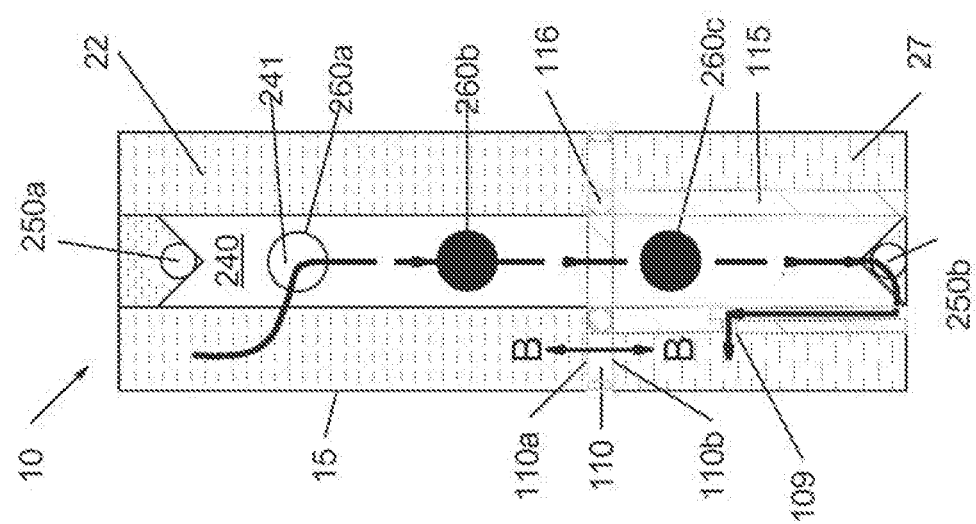
Figure 12A:
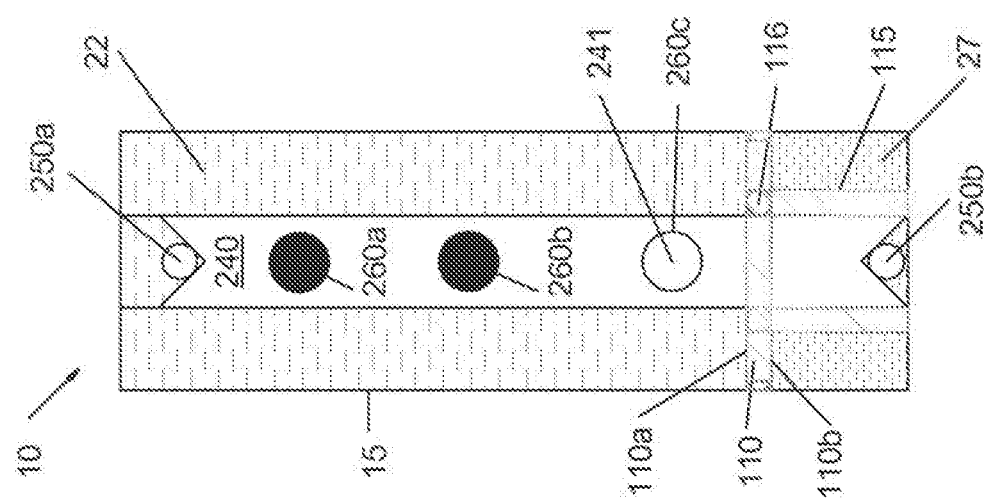
Figure 13C:
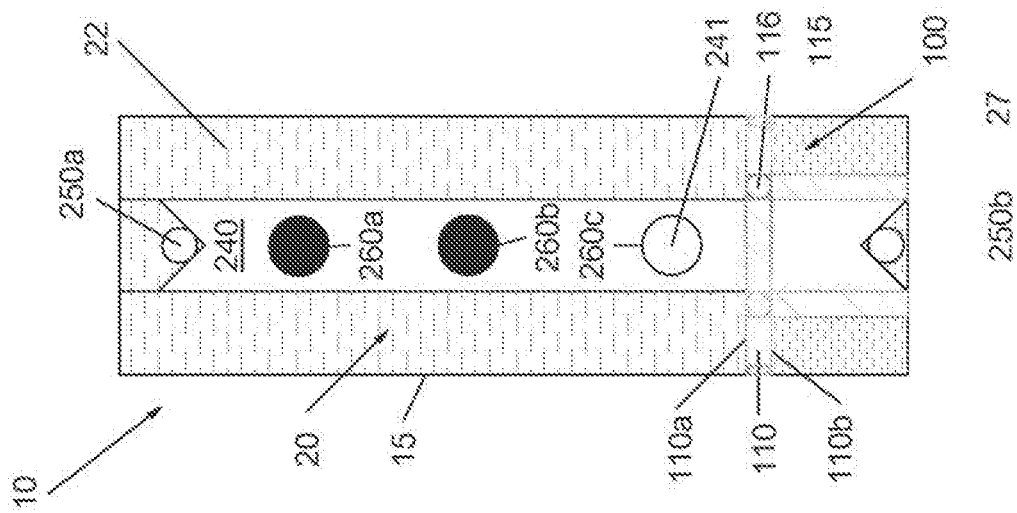
FIGS. 13A, 13B, and 13C depict the process of converting a gas spring according to the exemplary embodiment of the present invention from short travel to long travel.
Figure 13B:
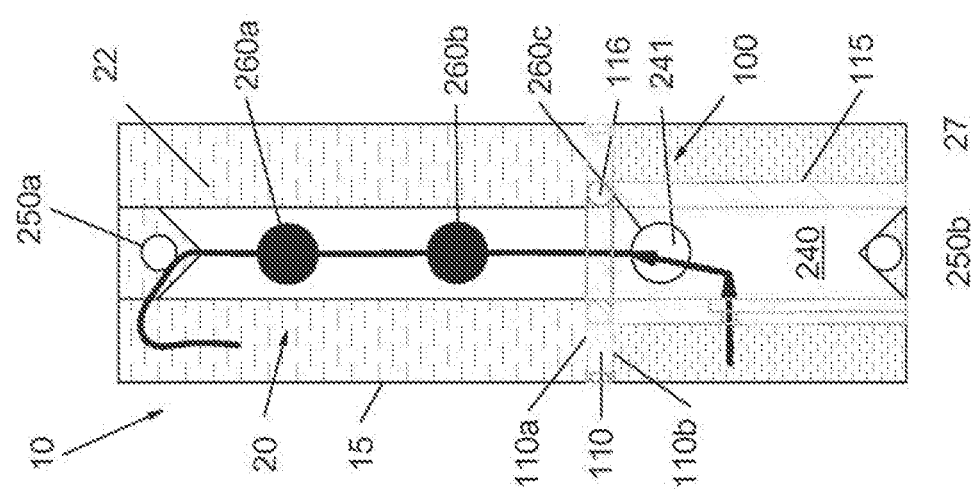
Figure 13A:
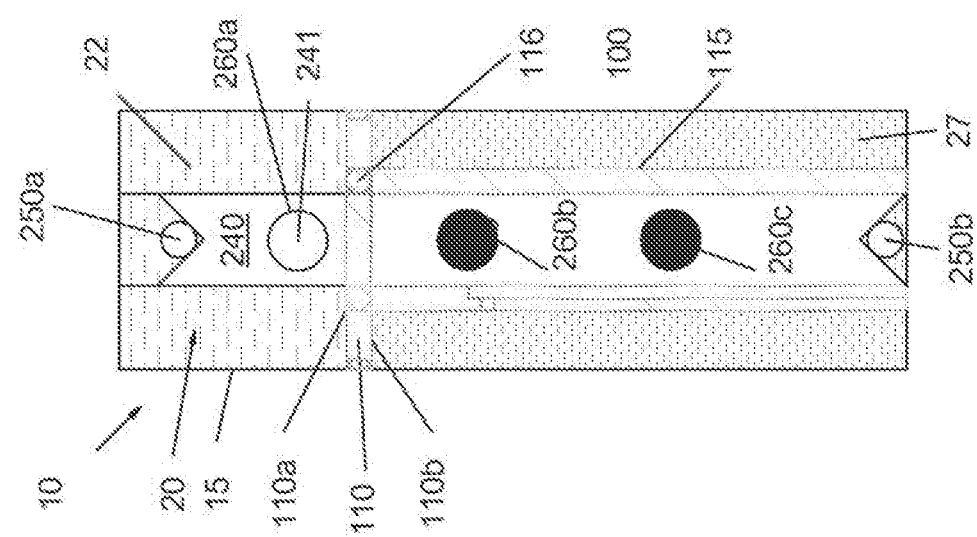

Finally, FIGS. 12 and 13, correspond to FIGS. 3 and 4, respectively in that FIGS. 12 and 13 depict how the gas spring according to another embodiment of the invention may be converted from long travel mode to short travel mode (FIG. 12) or short travel mode to long travel mode (FIG. 13). The general operation of the gas springs of FIGS. 12 and 13 only differ from those of FIGS. 3 and 4 in that the valve rod assembly previously described is used instead of a longitudinally moving radial hole 60.

Thus, in conclusion, by:

a) providing a valve rod assembly having an internal fluid path;

b) placing the gas chamber in fluid communication with the fluid path at a plurality of longitudinal positions corresponding to a plurality of different travel modes; and c) using a valve rod having at least one valve bore to place only one of the longitudinal positions in fluid communication with the fluid path, a method of changing the travel mode of a gas spring having a gas chamber filled with a gas may be provided.

Additionally, it is possible that in the method, the step of using a valve rod may include the step of rotating the valve rod less than one turn.

Additionally, it is further possible in the method that the step of rotating the valve rod moves the valve bore a distance substantially less than the distance between the plurality of different travel modes.

Additionally, it is further possible in the method that the step of rotating the valve rod and moving the valve bore also includes moving the valve bore longitudinally.

The above description is given in reference to exemplary embodiments of an improved gas spring control for a suspension. However, it is understood that many variations are apparent to one of ordinary skill in the art from a reading of the above specification and such variations are within the spirit and scope of the instant invention as defined by the following appended claims.

| List of Reference Numerals Used | |
|---|---|
| U | Upper fork leg |
| F | Fork |
| K | Knob |
| L | Lower fork leg |
| Q | Gas flow |
| 10 | Gas spring |
| 15 | Gas spring body |
| 20 | Gas chamber |
| 22 | First gas chamber |
| 27 | Second gas chamber |
| 40 | Valve rod |
| 41 | Fluid path |
| 42 | Closed head portion |
| 51 | o-ring |
| 52 | Vent hole |
| 60 | Through hole |
| 61 | Depression |
| 50A, 50B | Check valve |
| 100 | Piston assembly |
| 109 | Vent |
| 110 | Main piston body |
| 110a, b | Piston surfaces |
| 115 | Collar portion |
| 116 | o-ring |
| 240 | Valve rod assembly |
| 241 | Fluid path |
| 242 | Valve tubes |
| 245 | Valve tubes |
| 246 | Valve ring |
| 250a, 250b | Check valves |
| 251 | o-ring |
| 252 | Ball bearing |
| 253 | Spring |
| 255 | Inner valve rod |
| 257 | Valve rod bore |
| 260a, 260b, 260c | Through holes |
| 270 | Outer seals |
| 271 | Inner seals |
| 280a, 280b, 280c | Bores |
| 285a, 285b, 285c | Gas gaps |

What we claim is:

1. A gas spring suspension comprising:
an internal gas chamber;
a valve rod disposed within said internal gas chamber, said valve rod further comprising:
an internal fluid path; and
at least one through hole formed in said valve rod, said through hole configured to enable fluid communication between said internal gas chamber and said internal fluid path of said valve rod;
a moveable piston assembly disposed within said internal gas chamber, said moveable piston assembly dividing said internal gas chamber into a first variable volume gas chamber and a second variable volume gas chamber, said moveable piston assembly configured to move with respect to said valve rod; and
an adjuster disposed external to said internal gas chamber, said adjuster coupled to said valve rod and configured to adjust a location of said through hole within said internal gas chamber to one of a plurality of discrete positions of said through hole, each of said plurality of discrete locations of said through hole within said internal gas chamber corresponding to a respective one of a plurality of travel modes for said gas spring suspension, said adjuster having a plurality of discrete positions wherein each of said plurality of discrete positions of said adjuster corresponds to a respective one of said plurality of discrete positions of said through hole.

2. The gas spring suspension of claim 1 wherein said adjuster is a rotatable knob.

3. The gas spring suspension of claim 2 wherein all of said plurality of travel modes can be achieved by less than a full rotation of said rotatable knob.

4. The gas spring suspension of claim 2 wherein all of said plurality of travel modes can be achieved by approximately a 90 degree rotation of said rotatable knob.

5. The gas spring suspension of claim 2 wherein said rotatable knob is disposed at an upper end of said gas spring suspension.

6. The gas spring suspension of claim 2 wherein said rotatable knob is disposed such that said rotatable knob is externally accessible and hand operable by a rider during use of said vehicle to which said gas suspension is coupled.

7. The gas spring suspension of claim 2 wherein said plurality of travel modes are comprised of a short travel mode, a medium travel mode, and a long travel mode.

8. A gas spring suspension comprising:
an internal gas chamber;
a valve rod disposed within said internal gas chamber, said valve rod further comprising:
an internal fluid path; and
at least one through hole formed in said valve rod, said through hole configured to enable fluid communication between said internal gas chamber and said internal fluid path of said valve rod;
a moveable piston assembly disposed within said internal gas chamber, said moveable piston assembly dividing said internal gas chamber into a first variable volume gas chamber and a second variable volume gas chamber, said moveable piston assembly configured to move with respect to said valve rod; and
a rotatable knob disposed external to said internal gas chamber at an upper end of said gas spring suspension, said rotatable knob coupled to said valve rod and configured to adjust a location of said through hole within said internal gas chamber to one of a plurality of discrete positions of said through hole, each of said plurality of discrete locations of said through hole within said internal gas chamber corresponding to a respective one of a plurality of travel modes for said gas spring suspension, said rotatable knob having a plurality of discrete positions wherein each of said plurality of discrete positions of said rotatable knob corresponds to a respective one of said plurality of discrete positions of said through hole.

9. The gas spring suspension of claim 8 wherein all of said plurality of travel modes can be achieved by less than a full rotation of said rotatable knob.

10. The gas spring suspension of claim 8 wherein all of said plurality of travel modes can be achieved by approximately a 90 degree rotation of said rotatable knob.

11. The gas spring suspension of claim 8 wherein said rotatable knob is disposed such that said rotatable knob is externally accessible and hand operable by a rider during use of said vehicle to which said gas suspension is coupled.

12. The gas spring suspension of claim 8 wherein said plurality of travel modes are comprised of a short travel mode, a medium travel mode, and a long travel mode.

13. A gas spring suspension comprising:
an internal gas chamber;
a valve rod disposed within said internal gas chamber, said valve rod further comprising:
an internal fluid path; and
at least one through hole formed in said valve rod, said through hole configured to enable fluid communication between said internal gas chamber and said internal fluid path of said valve rod;
a moveable piston assembly disposed within said internal gas chamber, said moveable piston assembly dividing said internal gas chamber into a first variable volume gas chamber and a second variable volume gas chamber, said moveable piston assembly configured to move with respect to said valve rod; and
a rotatable knob disposed external to said internal gas chamber at an upper end of said gas spring suspension, said rotatable knob externally accessible and hand operable by a rider during use of said vehicle to which said gas suspension is coupled, said rotatable knob coupled to said valve rod and configured to adjust a location of said through hole within said internal gas chamber to one of a plurality of discrete positions of said through hole, each of said plurality of discrete locations of said through hole within said internal gas chamber corresponding to a respective one of a plurality of travel modes for said gas spring suspension, said rotatable knob having a plurality of discrete positions wherein each of said plurality of discrete positions of said rotatable knob corresponds to a respective one of said plurality of discrete positions of said through hole, and wherein all of said plurality of travel modes can be achieved by less than a full rotation of said rotatable knob.

14. The gas spring suspension of claim 13 wherein all of said plurality of travel modes can be achieved by approximately a 90 degree rotation of said rotatable knob.

15. The gas spring suspension of claim 13 wherein said plurality of travel modes are comprised of a short travel mode, a medium travel mode, and a long travel mode.

* * * * *